United States Patent
Vigano et al.

(10) Patent No.: US 10,942,413 B2
(45) Date of Patent: Mar. 9, 2021

(54) POWER MANAGEMENT FOR ELECTROCHROMIC WINDOW NETWORKS

(71) Applicant: View, Inc., Milpitas, CA (US)

(72) Inventors: Jose Vigano, Milpitas, CA (US); Stephen C. Brown, San Mateo, CA (US); Dhairya Shrivastava, Los Altos, CA (US)

(73) Assignee: View, Inc., Milpitas, CA (US)

( * ) Notice: Subject to any disclaimer, the term of this patent is extended or adjusted under 35 U.S.C. 154(b) by 147 days.

(21) Appl. No.: 15/910,931

(22) Filed: Mar. 2, 2018

(65) Prior Publication Data

US 2018/0187478 A1    Jul. 5, 2018

Related U.S. Application Data

(63) Continuation of application No. 15/739,562, filed on Dec. 22, 2017, which is a continuation-in-part of (Continued)

(51) Int. Cl.
*G02F 1/163* (2006.01)
*E06B 9/24* (2006.01)
(Continued)

(52) U.S. Cl.
CPC .............. *G02F 1/163* (2013.01); *E06B 9/24* (2013.01); *G02F 1/155* (2013.01); *G09G 3/19* (2013.01);
(Continued)

(58) Field of Classification Search
CPC ........ G02F 1/155; G02F 1/153; G02F 1/1523; G02F 1/157; G02F 1/1533; G02F 1/163;
(Continued)

(56) References Cited

U.S. PATENT DOCUMENTS 2,971,186 A    2/1961   Ripepi
4,969,229 A    11/1990  Svanberg
(Continued)

FOREIGN PATENT DOCUMENTS

CN    101501757 A    8/2009
CN    102414601 A    4/2012
(Continued)

OTHER PUBLICATIONS

U.S. Office Action dated Aug. 7, 2018 in U.S. Appl. No. 15/910,936.
(Continued)

*Primary Examiner* — William R Alexander
*Assistant Examiner* — Sharrief I Broome
(74) *Attorney, Agent, or Firm* — Weaver Austin Villeneuve & Sampson LLP; Brian D. Griedel

(57) ABSTRACT

Various embodiments herein relate to networks of electrochromic windows. The networks may be configured in particular ways to minimize the likelihood that the windows on the network draw more power than can be provided. The network may include particular hardware components that provide additional power to windows as needed. The network may also be configured to adjust how the windows therein transition to prevent overloading the network. The techniques described herein can be used to design networks of electrochromic windows that are undersized when considering the amount of power that would be needed to simultaneously transition all the windows on the network using normal transition parameters, while still allowing simultaneous transitions to occur.

16 Claims, 9 Drawing Sheets

Related U.S. Application Data application No. PCT/US2015/038667, filed on Jun. 30, 2015, and a continuation-in-part of application No. PCT/US2016/041176, filed on Jul. 6, 2016.

(60) Provisional application No. 62/019,325, filed on Jun. 30, 2014, provisional application No. 62/191,975, filed on Jul. 13, 2015, provisional application No. 62/190,012, filed on Jul. 8, 2015.

(51) Int. Cl.
    *H04L 29/08* (2006.01)
    *G09G 3/19* (2006.01)
    *G02F 1/155* (2006.01)

(52) U.S. Cl.
    CPC .... *H04L 67/125* (2013.01); *E06B 2009/2464* (2013.01)

(58) Field of Classification Search
    CPC .... G02F 1/161; G02F 1/15; G02F 2001/1555; G02F 1/15165; G02F 2001/1536; G02F 1/1503; G02F 2001/164; G02F 1/1506; G02F 1/1508; G02F 2001/15145; G02F 2202/36; G02F 1/0018; G02F 1/1525; G02F 2001/1502; B60R 1/088; B60R 1/04; B60R 1/082; B60R 1/1207; B60R 2001/1215; B60R 1/02; B60R 1/08; B60R 1/084; B60R 1/12; B60R 2001/1223; B60R 11/02; B60R 11/0235; B60R 16/0207; B60R 16/0215; B60R 16/03; B60R 1/025; B60R 1/06; B60R 1/0602; B60R 1/072; B60R 1/086; G02B 5/08; G02B 5/0808; G02B 1/18; G02B 26/005; G02B 5/085; G02B 13/0075; G02B 27/0006; G02B 27/58; G02B 5/003; G02B 5/005; G02B 5/04; G02B 5/205; G02B 5/23; G02B 6/0055; G02B 7/182

See application file for complete search history.

(56) References Cited

U.S. PATENT DOCUMENTS

| | | |
|---|---|---|
| 5,365,365 A | 11/1994 | Ripoche et al. |
| 5,579,149 A | 11/1996 | Moret et al. |
| 5,705,983 A | 1/1998 | Tweadey, II et al. |
| 6,055,089 A | 4/2000 | Schulz et al. |
| 6,262,831 B1 | 7/2001 | Bauer et al. |
| 6,794,882 B2 | 9/2004 | Jessup |
| 6,795,226 B2 | 9/2004 | Agrawal et al. |
| 6,829,511 B2 | 12/2004 | Bechtel et al. |
| 7,133,181 B2 | 11/2006 | Greer |
| 7,161,483 B2* | 1/2007 | Chung ............... H04L 12/2803 340/12.53 |
| 7,684,105 B2 | 3/2010 | Lamontagne et al. |
| 7,941,245 B1 | 5/2011 | Popat |
| 8,004,739 B2 | 8/2011 | Letocart |
| 8,018,644 B2 | 9/2011 | Gustavsson et al. |
| 8,213,074 B1 | 7/2012 | Shrivastava et al. |
| 8,219,217 B2 | 7/2012 | Bechtel et al. |
| 8,254,013 B2 | 8/2012 | Mehtani et al. |
| 8,270,059 B2 | 9/2012 | Friedman et al. |
| 8,300,298 B2 | 10/2012 | Wang et al. |
| 8,526,094 B2 | 9/2013 | Letocart |
| 8,669,325 B1 | 3/2014 | Hyman |
| 8,705,162 B2 | 4/2014 | Brown et al. |
| 8,764,950 B2 | 7/2014 | Wang et al. |
| 8,764,951 B2 | 7/2014 | Wang et al. |
| 8,843,238 B2 | 9/2014 | Wenzel et al. |
| 8,890,456 B2 | 11/2014 | Berman et al. |
| 9,016,630 B2 | 4/2015 | Mitchell et al. |
| 9,081,246 B2 | 7/2015 | Rozbicki |
| 9,250,494 B2 | 2/2016 | Podbelski et al. |
| 9,454,055 B2 | 9/2016 | Brown et al. |
| 9,546,515 B2 | 1/2017 | Hall et al. |
| 9,677,327 B1 | 6/2017 | Nagel et al. |
| 9,885,935 B2 | 2/2018 | Jack et al. |
| 10,299,101 B1 | 5/2019 | Lim et al. |
| 10,387,221 B2 | 8/2019 | Shrivastava et al. |
| 10,481,459 B2 | 11/2019 | Shrivastava et al. |
| 2002/0015214 A1 | 2/2002 | Nishikitani et al. |
| 2002/0021481 A1 | 2/2002 | Lin et al. |
| 2005/0046563 A1* | 3/2005 | Whitney ............... F24F 11/70 340/506 |
| 2006/0142978 A1 | 6/2006 | Suenbuel et al. |
| 2006/0158805 A1 | 7/2006 | Malvino |
| 2006/0255922 A1* | 11/2006 | Taki ............... E05F 15/40 340/438 |
| 2007/0040657 A1 | 2/2007 | Fosler et al. |
| 2007/0053053 A1 | 3/2007 | Moskowitz |
| 2007/0088963 A1 | 4/2007 | Nakaya |
| 2007/0285759 A1 | 12/2007 | Ash et al. |
| 2008/0115428 A1 | 5/2008 | Schlam et al. |
| 2008/0144158 A1 | 6/2008 | Stavaeus et al. |
| 2008/0196331 A1* | 8/2008 | Boyd ............... E06B 5/003 52/202 |
| 2008/0211682 A1 | 9/2008 | Hyland et al. |
| 2009/0020233 A1 | 1/2009 | Berman et al. |
| 2009/0027759 A1 | 1/2009 | Albahri |
| 2009/0324010 A1 | 12/2009 | Hou |
| 2010/0082081 A1 | 4/2010 | Niessen et al. |
| 2010/0225640 A1 | 9/2010 | Vieri |
| 2010/0243427 A1 | 9/2010 | Kozlowski et al. |
| 2010/0245973 A1 | 9/2010 | Wang et al. |
| 2011/0087988 A1 | 4/2011 | Ray et al. |
| 2011/0148218 A1 | 6/2011 | Rozbicki |
| 2011/0184582 A1 | 7/2011 | Jang et al. |
| 2011/0185052 A1 | 7/2011 | Nakahira |
| 2011/0266137 A1 | 11/2011 | Wang et al. |
| 2011/0266138 A1 | 11/2011 | Wang et al. |
| 2011/0267674 A1 | 11/2011 | Wang et al. |
| 2011/0267675 A1 | 11/2011 | Wang et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0188627 A1* | 7/2012 | Chen ............... H04Q 9/00 359/275 |
| 2012/0229275 A1 | 9/2012 | Mattem |
| 2012/0235493 A1 | 9/2012 | Kiuchi et al. |
| 2012/0236386 A1* | 9/2012 | Mehtani ............... G02F 1/163 359/265 |
| 2012/0256009 A1 | 10/2012 | Mucignat et al. |
| 2012/0267952 A1 | 10/2012 | Ballatine et al. |
| 2012/0275008 A1 | 11/2012 | Pradhan et al. |
| 2012/0303397 A1 | 11/2012 | Prosser |
| 2012/0307352 A1 | 12/2012 | Jain et al. |
| 2013/0063065 A1* | 3/2013 | Berman ............... H04L 12/2827 318/480 |
| 2013/0085614 A1 | 4/2013 | Wenzel et al. |
| 2013/0085616 A1 | 4/2013 | Wenzel et al. |
| 2013/0222881 A1 | 8/2013 | Aizenbelg et al. |
| 2013/0271812 A1* | 10/2013 | Brown ............... E06B 9/24 359/275 |
| 2013/0271813 A1 | 10/2013 | Brown |
| 2013/0271814 A1 | 10/2013 | Brown |
| 2013/0271815 A1* | 10/2013 | Pradhan ............... G02F 1/15 359/275 |
| 2013/0278989 A1 | 10/2013 | Lam et al. |
| 2013/0335802 A1 | 12/2013 | Kim et al. |
| 2014/0160550 A1 | 6/2014 | Brown et al. |
| 2014/0236323 A1 | 8/2014 | Brown et al. |
| 2014/0268287 A1 | 9/2014 | Brown et al. |
| 2014/0277795 A1 | 9/2014 | Matsuoka et al. |
| 2014/0313032 A1* | 10/2014 | Sager ............... G08B 25/003 340/539.17 |
| 2014/0330538 A1 | 11/2014 | Conklin et al. |
| 2014/0349497 A1 | 11/2014 | Brown et al. |
| 2014/0354047 A1 | 12/2014 | Markhovsky et al. |
| 2014/0368899 A1* | 12/2014 | Greer ............... G05B 15/02 359/275 |

(56) References Cited

U.S. PATENT DOCUMENTS

| | | | |
|---|---|---|---|
| 2015/0060648 | A1 | 3/2015 | Brown et al. |
| 2015/0098121 | A1 | 4/2015 | Turnbull et al. |
| 2015/0103389 | A1 | 4/2015 | Klawuhn et al. |
| 2015/0116811 | A1 | 4/2015 | Shrivastava et al. |
| 2015/0219975 | A1 | 8/2015 | Phillips et al. |
| 2015/0338713 | A1 | 11/2015 | Brown et al. |
| 2015/0378231 | A1 | 12/2015 | Greer et al. |
| 2016/0054633 | A1 | 2/2016 | Brown et al. |
| 2016/0054634 | A1 | 2/2016 | Brown et al. |
| 2016/0124283 | A1 | 5/2016 | Brown et al. |
| 2016/0147100 | A1 | 5/2016 | Van Oosteen et al. |
| 2016/0154290 | A1 | 6/2016 | Brown et al. |
| 2016/0202590 | A1 | 7/2016 | Ziebarth et al. |
| 2017/0052753 | A1 | 2/2017 | Paolini, Jr. |
| 2017/0075183 | A1 | 3/2017 | Brown |
| 2017/0075323 | A1 | 3/2017 | Shrivastava et al. |
| 2017/0097259 | A1 | 4/2017 | Brown et al. |
| 2017/0097553 | A1 | 4/2017 | Jack et al. |
| 2017/0122802 | A1 | 5/2017 | Brown et al. |
| 2017/0131610 | A1 | 5/2017 | Brown et al. |
| 2017/0146884 | A1 | 5/2017 | Vigano et al. |
| 2017/0210413 | A1 | 7/2017 | Tsujioka |
| 2017/0212400 | A1 | 7/2017 | Shrivastava et al. |
| 2017/0269451 | A1 | 9/2017 | Shrivastava et al. |
| 2017/0285433 | A1 | 10/2017 | Shrivastava et al. |
| 2018/0129172 | A1 | 5/2018 | Shrivastava et al. |
| 2018/0188627 | A1 | 7/2018 | Vigano et al. |
| 2018/0188628 | A1 | 7/2018 | Brown et al. |
| 2018/0189117 | A1 | 7/2018 | Shrivastava et al. |
| 2019/0011798 | A9 | 1/2019 | Brown et al. |
| 2019/0025661 | A9 | 1/2019 | Brown et al. |
| 2019/0204705 | A1 | 7/2019 | Vigano et al. |
| 2019/0235343 | A1 | 8/2019 | Vigano et al. |
| 2019/0317458 | A1 | 10/2019 | Shrivastava et al. |
| 2019/0384652 | A1 | 12/2019 | Shrivastava et al. |
| 2019/0391419 | A1 | 12/2019 | De Jong et al. |
| 2020/0041861 | A1 | 2/2020 | Shrivastava et al. |
| 2020/0265089 | A1 | 8/2020 | Zhang et al. |

FOREIGN PATENT DOCUMENTS

| | | | |
|---|---|---|---|
| CN | 102598469 | A | 7/2012 |
| CN | 103547965 | A | 1/2014 |
| CN | 104114804 | A | 10/2014 |
| CN | 205743507 | U | 11/2016 |
| DE | 2933371 | A1 | 3/1981 |
| DE | 102014220818 | A1 | 4/2016 |
| EP | 2509189 | A1 | 10/2012 |
| EP | 3104352 | A1 | 12/2016 |
| GB | 2169426 | A | 7/1986 |
| WO | WO89/006302 | | 7/1989 |
| WO | WO2017/059362 | | 4/2007 |
| WO | WO2013/101766 | A1 | 7/2013 |
| WO | WO2013/155467 | | 10/2013 |
| WO | WO2013/177575 | A1 | 11/2013 |
| WO | WO2014/082092 | | 5/2014 |
| WO | WO2014/209812 | | 12/2014 |
| WO | WO2015/171886 | | 11/2015 |
| WO | WO2016/004109 | | 1/2016 |
| WO | WO2016/085964 | | 6/2016 |
| WO | WO2017/007841 | | 1/2017 |
| WO | WO2017/007942 | | 1/2017 |
| WO | WO2017/062592 | | 4/2017 |
| WO | WO2017/075059 | | 5/2017 |
| WO | WO2017/155833 | | 9/2017 |
| WO | WO2017/189307 | | 11/2017 |
| WO | WO2017/192881 | | 11/2017 |
| WO | WO2018/019473 | A1 | 2/2018 |
| WO | WO2018/098089 | | 5/2018 |
| WO | WO2018/112095 | | 6/2018 |
| WO | WO2018/112241 | | 6/2018 |
| WO | WO2018/152249 | A1 | 8/2018 |
| WO | WO2018/200740 | A1 | 11/2018 |
| WO | WO2018/200752 | | 11/2018 |

OTHER PUBLICATIONS

U.S. Notice of Allowance dated Dec. 14, 2018 in U.S. Appl. No. 15/910,936.
U.S. Office Action dated Sep. 4, 2018 in U.S. Appl. No. 15/320,725.
International Search Report and Written Opinion (ISA/KR) dated Oct. 16, 2015, in PCT Application No.
International Preliminary Report on Patentability dated Jan. 12, 2017, in PCT Application No. PCT/US15/38667.
EP Extended Search Report dated Feb. 15, 2018 in EP Application No. 15814233.1.
International Search Report and Written Opinion (ISA/KR) dated Oct. 4, 2016, in PCT Application No. PCT/US16/41176.
International Preliminary Report on Patentbility dated Jan. 18, 2018 in PCT Application No. PCT/US16/41176.
International Search Report and Written Opinion (ISA/KR) dated May 23, 2018 in PCT Application No. PCT/US2018/018241.
APC by Schneider Electric, Smart-UPS 120V Product Brochure, 2013, 8 pp.
Vinci Construction Datasheet for "Horizon-Solar Connected Window", Dec. 2016 (2 pp).
U.S. Preliminary Amendment filed Dec. 22, 2017 in U.S. Appl. No. 15/739,562.
U.S. Notice of Allowance dated Apr. 17, 2019 in U.S. Appl. No. 15/910,936.
U.S. Office Action dated Oct. 31, 2019 in U.S. Appl. No. 15/910,925.
International Search Report and Written Opinion (ISA/EP) dated Nov. 5, 2019, in PCT Application No. PCT/US2019/035544.
U.S. Preliminary Amendment filed Jan. 31, 2020 in U.S. Appl. No. 16/599,093.
U.S. Notice of Allowance dated Mar. 20, 2019 in U.S. Appl. No. 15/320,725.
U.S. Notice of Allowance dated Jul. 17, 2019 in U.S. Appl. No. 15/320,725.
U.S. Notice of Allowance (corrected) dated Apr. 18, 2019 in U.S. Appl. No. 15/320,725.
U.S. Office Action dated Jan. 7, 2020 in U.S. Appl. No. 15/320,725.
U.S. Office Action dated Dec. 19, 2019 in U.S. Appl. No. 16/297,461.
U.S. Office Action dated Nov. 27, 2019 in U.S. Appl. No. 16/380,929.
EP Search Report (Partial) dated Jun. 24, 2019 in EP Application No. 16821927.7.
EP Search Report (Extended) dated Oct. 28, 2019 in EP Application No. 16821927.7.
International Preliminary Report on Patentability dated Aug. 29, 2019 in PCT Application No. PCT/US2018/018241.
EP Examination Report dated Mar. 4, 2019 in EP Application No. 15814233.1.
U.S. Appl. No. 16/555,377, filed Aug. 29, 2019, Shrivastava et al.
U.S. Appl. No. 16/486,113, filed Aug. 14, 2019, Tinianov et al.
U.S. Final Office Action dated Apr. 24, 2020 in U.S. Appl. No. 15/320,725.
U.S. Final Office Action dated Apr. 24, 2020 in U.S. Appl. No. 16/297,461.
U.S. Final Office Action dated Apr. 17, 2020 in U.S. Appl. No. 16/380,929.
CN Office Action dated Mar. 9, 2020 in CN Application No. 201580040461.4.
EP Extended Search Report dated May 28, 2020 in EP Application No. 20151714.1.
U.S. Office Action dated May 5, 2020 in U.S. Appl. No. 15/910,925.
U.S. Advisory Action dated Jul. 20, 2020 in U.S. Appl. No. 15/320,725.
U.S. Office Action dated Aug. 21, 2020 in U.S. Appl. No. 15/320,725.
U.S. Office Action dated Jul. 24, 2020 in U.S. Appl. No. 16/297,461.
U.S. Notice of Allowance dated Nov. 6, 2020 in U.S. Appl. No. 16/297,461.
U.S. Office Action dated Jul. 23, 2020 in U.S. Appl. No. 16/380,929.
U.S. Final Office Action dated Nov. 18, 2020 in U.S. Appl. No. 16/380,929.
CN Office Action dated Oct. 21, 2020 in CN Application No. 201580040461.4.
U.S. Office Action dated Jul. 21, 2020 in U.S. Appl. No. 16/555,377.
U.S. Office Action dated Aug. 21, 2020 in U.S. Appl. No. 15/910,925.

(56) References Cited

OTHER PUBLICATIONS

CN Office Action dated Oct. 19, 2020 in CN Application No. 201680044659.4.
U.S. Final Office Action dated Dec. 2, 2020 in U.S. Appl. No. 15/910,925.

* cited by examiner

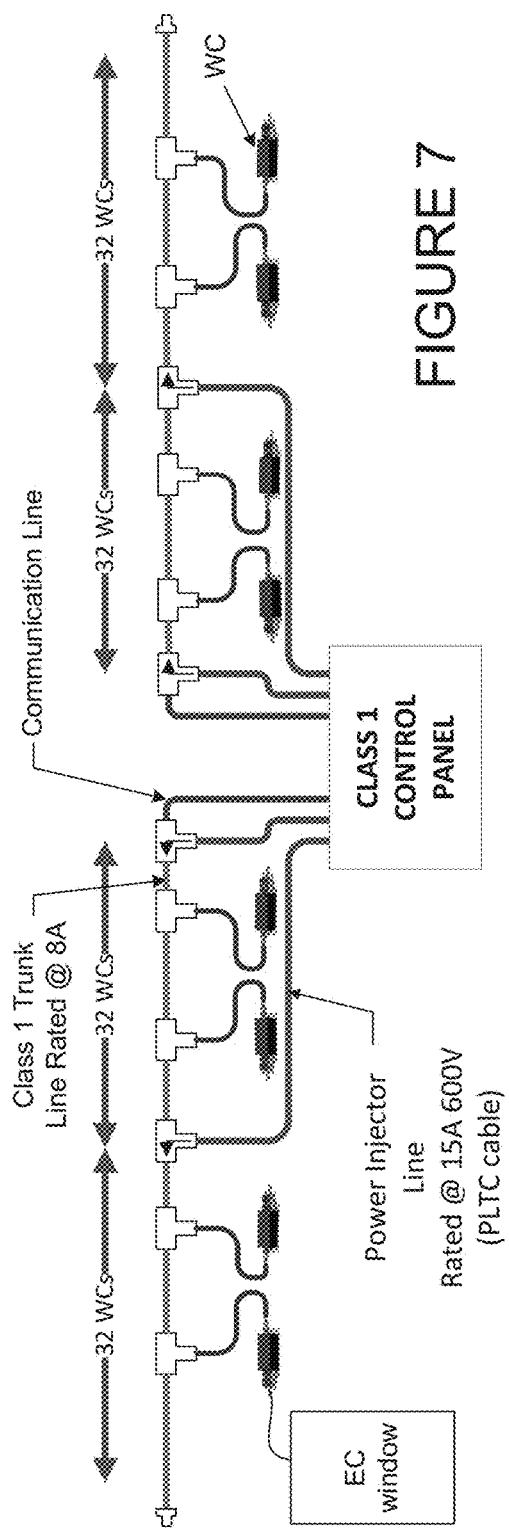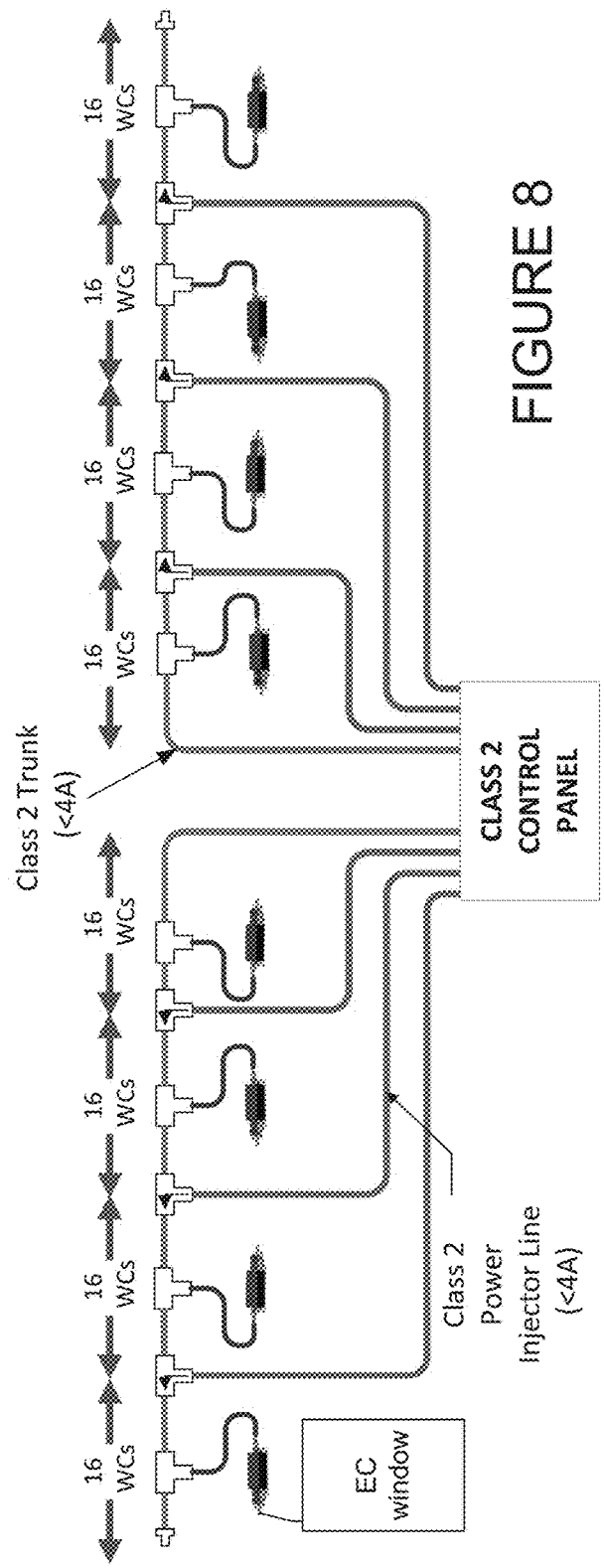

POWER MANAGEMENT FOR ELECTROCHROMIC WINDOW NETWORKS

CROSS REFERENCE TO RELATED APPLICATIONS

This application is a continuation of and claims priority to U.S. patent application Ser. No. 15/739,562, titled "POWER MANAGEMENT FOR ELECTROCHROMIC WINDOW NETWORKS," filed on Dec. 22, 2017, which is a 35 U.S.C. § 371 National Phase application for PCT Application No. PCT/US16/41176, titled "POWER MANAGEMENT FOR ELECTROCHROMIC WINDOW NETWORKS," filed Jul. 6, 2016, which claims benefit of priority to U.S. Provisional Patent Application No. 62/190,012, filed Jul. 8, 2015, and titled "POWER MANAGEMENT FOR ELECTROCHROMIC WINDOW NETWORKS"; and to U.S. Provisional Patent Application No. 62/191,975, filed Jul. 13, 2015, and titled "POWER MANAGEMENT FOR ELECTROCHROMIC WINDOW NETWORKS," each of which is herein incorporated by reference in its entirety and for all purposes. The Ser. No. 15/739,562 application is also a continuation-in-part of PCT Patent Application No. PCT/US15/38667, filed Jun. 30, 2015, and titled "CONTROL METHODS AND SYSTEMS FOR NETWORKS OF OPTICALLY SWITCHABLE WINDOWS DURING REDUCED POWER AVAILABILITY," which claims benefit of priority to U.S. Provisional Application No. 62/019,325, filed Jun. 30, 2014, and titled "UNINTERRUPTABLE POWER SUPPLIES FOR NETWORKS OF OPTICALLY SWITCHABLE WINDOWS," each of which is herein incorporated by reference in its entirety and for all purposes.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material, for example, is tungsten oxide ($WO_3$). Tungsten oxide is a cathodic electrochromic material in which a coloration transition, transparent to blue, occurs by electrochemical reduction.

Electrically switchable windows, whether electrochromic or otherwise, may be used in buildings to control transmission of solar energy. Switchable windows may be manually or automatically tinted and cleared to reduce energy consumption, by heating, air conditioning and/or lighting systems, while maintaining occupant comfort.

Only recently have designers begun developing control and power systems for buildings having many electrically tintable windows. As a consequence, many developments are required before such systems can operate reliably and approach their potential.

SUMMARY

Various embodiments herein relate to power distribution networks for electrochromic windows, and methods of forming such networks. In many cases, a power distribution network is capable of managing the supply of power and/or the demand for power to avoid over-taxing the network. In some cases, a network may be capable of delivering power to windows at a higher rate than power is delivered to the network. Local energy storage units such as energy wells may be provided to accomplish this feature. In these or other cases, a power distribution network may be capable of adjusting transition parameters on the electrochromic windows to reduce a demand for power. In some cases, a network may be modified to include additional electrochromic windows with minimal disruption to the network.

In one aspect of the disclosed embodiments, a network is provided, the network including: (a) two or more window assemblies, each including: at least one electrochromic pane, and a window controller for driving optical transitions on the electrochromic pane; (b) a power supply electrically connected with the window assemblies; and (c) one or more energy wells electrically connected with the power supply and with the window assemblies, wherein the one or more energy wells are provided electrically downstream from the power supply and electrically upstream from at least one of the window assemblies, where the network is configured to transfer power from the energy wells to the window assemblies when the window assemblies collectively demand a greater amount of power than can be provided by the power supply, and to transfer power from the power supply to the energy wells to recharge the energy wells when the window assemblies collectively demand a lower amount of power than can be provided by the power supply.

In certain implementations, the power supply may be a class 2 power supply. In other implementations, the power supply may be a class 1 power supply. The energy well may include a supercapacitor in some cases. In these or other cases, the energy well may include a rechargeable battery. The energy well may have an energy storage capacity sufficient to simultaneously drive an optical transition in at least 2 window assemblies on the network. In some cases, a number of energy wells may be provided. In one example, at least one energy well is provided per every 4 window assemblies on the network. The energy wells may be integrated into the window assemblies in some embodiments.

In various embodiments, the network may further include a network controller and/or a master controller communicatively coupled with the window controller of each of the two or more window assemblies. The network controller and/or master controller may be configured to cause one or more of the window assemblies to undergo a first optical transition using a first set of transition parameters when a first condition is present, and to cause one or more of the window assemblies to undergo a second optical transition using a second set of transition parameters when a second condition is present, the first condition being different from the second condition.

In some cases, the first condition may relate to a condition where the window assemblies collectively demand relatively more power, and the second condition may relate to a condition where the window assemblies collectively demand relatively less power. The first condition may relate to a situation where, e.g., the window assemblies directed to transition would collectively demand, if transitioned using the second set of transition parameters, either (i) more power than can be provided by the power supply and the one or more energy wells, or (ii) more than a certain fraction of the power that can be provided by the power supply and the one or more energy wells.

The second condition may relate to a situation where, e.g., certain zones of windows or an entire group or network of windows in the network require less power to transition, e.g., when the window assemblies directed to transition would collectively demand, if transitioned using the second set of transition parameters, either (i) less power than can be provided by the power supply and the one or more energy wells, or (ii) less than a certain fraction of the power that can be provided by the power supply and the one or more energy wells. In certain cases when the second condition is present, power from the power supply may be directed to recharge the one or more energy wells. In these or other embodiments, when the second condition is present, power from the power supply may be used for other purposes off the network, e.g., the power may be used to feed the local power grid or other building systems. In some cases the network, by virtue of its energy wells, can supply extra power required by the windows, alone or in combination with the power supply(ies) in the network. The network may further include a sensor for measuring voltage and/or current. The measured voltage and/or current may relate to the voltage and/or current delivered from or to any component on the network.

In a further aspect of the disclosed embodiments, a network is provided, the network including: (a) two or more window assemblies, each including: at least one electrochromic pane, and a window controller for driving optical transitions on the electrochromic pane; (b) one or more power sources including at least a primary power supply and, optionally, one or more energy wells, the power source(s) being electrically connected with the window assemblies; and (c) a network controller and/or master controller communicatively coupled to the window controllers, where the network controller and/or master controller includes instructions to prevent the window assemblies from collectively demanding more power than can be delivered by the power source(s), where the instructions include: (i) prioritizing transition of certain window assemblies such that certain window assemblies transition before other window assemblies, and/or (ii) using a modified set of drive transition parameters for driving optical transitions on the window assemblies when the power needed to transition the window assemblies collectively exceeds a threshold, where the modified set of drive transition parameters is different from a first set of drive transition parameters used to drive optical transitions on the window assemblies when the power needed to transition the window assemblies is collectively under the threshold.

In certain implementations, the network controller and/or master controller may be configured to stagger the transitions of the window assemblies over time. In these or other implementations, the network controller and/or master controller may be configured to use the modified set of drive transition parameters, where the modified set of drive transition parameters results in a lower collective power use, per unit of time, compared to the first set of drive transition parameters. In some such implementations, each of the first set and the modified set of drive transition parameters may include a ramp to drive voltage rate, where the ramp to drive voltage rate of the modified set of drive transition parameters has a lower magnitude than the ramp to drive voltage rate of the first set of drive transition parameters. In these or other implementations, each of the first set and the modified set of drive transition parameters may include a drive voltage, where the drive voltage of the modified set of drive transition parameters has a lower magnitude than the drive voltage of the first set of drive transition parameters. In various embodiments, the one or more power sources may have a maximum collective power output, where simultaneously driving optical transitions on two or more window assemblies using the first set of drive transition parameters would involve a greater amount of power than the maximum collective power output of the one or more power sources. In certain embodiments, the one or more energy wells may provide power to the window assemblies at times when the power collectively demanded by the window assemblies is above a second threshold, and may recharge from the primary power supply when the power collectively demanded by the window assemblies is below the second threshold, where the second threshold is based on a maximum power that can be delivered by the primary power supply. The energy wells may include supercapacitors in some cases. In these or other cases, the energy wells may include rechargeable batteries.

In another aspect of the disclosed embodiments, a network is provided, the network including: (a) two or more window assemblies, each including: at least one electrochromic pane, a window controller for driving optical transitions on the electrochromic pane, and a supercapacitor for powering optical transitions on the electrochromic pane; (b) a power supply electrically connected with the window assemblies, wherein the network is configured to transfer power from the supercapacitors to the electrochromic panes when the window assemblies collectively demand a greater amount of power than can be provided by the power supply, and to transfer power from the power supply to the supercapacitors to recharge the supercapacitors when the window assemblies collectively demand a lower amount of power than can be provided by the power supply. In some embodiments, the supercapacitors may be part of the window controllers.

In another aspect of the disclosed embodiments, a network is provided, the network including: (a) two or more window assemblies, each including: at least one electrochromic pane, and a window controller for driving optical transitions on the electrochromic pane; (b) a power supply electrically connected with the window assemblies; and (c) one or more energy wells electrically connected with the power supply and with the window assemblies, wherein the network is configured to: (i) transfer power from the energy well(s) to the window assemblies when the window assemblies collectively demand a greater amount of power than can be provided by the power supply, (ii) transfer power from the power supply to the energy well(s) to recharge the energy well(s) when the window assemblies collectively demand a lower amount of power than can be provided by the power supply, and (iii) transfer power from the energy well(s) to a power cable electrically positioned between the energy well(s) and the power supply when a command is received directing the network to do so.

In yet another aspect of the disclosed embodiments, a method of modifying a network of electrochromic windows is provided, the method including: installing one or more additional window assemblies in a pre-existing network of window assemblies, the pre-existing network including: two or more window assemblies, each window assembly including at least one electrochromic pane, two or more window controllers, each window controller electrically connected to one of the window assemblies, and one or more power supplies collectively having a maximum power output, where before installation of the one or more additional window assemblies, a power used to simultaneously drive optical transitions on all of the window assemblies using a first set of drive transition parameters is collectively below the maximum power output, where after installation of the one or more additional window assemblies, a power used to simultaneously drive optical transitions on all of the window assemblies using the first set of drive transition parameters collectively exceeds the maximum power output, and where after installation of the one or more additional window assemblies, the network can execute a command to simultaneously drive optical transitions on all of the window assemblies without demanding a level of power from the one or more power supplies that exceeds the maximum power output.

In certain embodiments, the method may further include installing one or more energy wells in electrical communication with (a) the one or more power supplies and (b) the two or more window assemblies of the pre-existing network and/or the one or more additional window assemblies. In other implementations, the method does not include installation of any additional power sources. In some implementations, the pre-existing network may further include one or more energy wells in addition to the one or more power supplies. In various embodiments, before installation of the one or more additional window assemblies, the network may be configured to use a first set of drive transition parameters to drive optical transitions on the window assemblies, and after installation of the one or more additional window assemblies, the network may be configured to use a modified set of drive transition parameters to drive optical transitions on the window assemblies, where the modified set of drive transition parameters results in a lower power usage per window assembly, per unit time, compared to the first set of drive transition parameters.

These and other features and advantages of the disclosed embodiments will be described in further detail below, with reference to the associated drawings.

BRIEF DESCRIPTION OF THE DRAWINGS

The following detailed description can be more fully understood when considered in conjunction with the drawings in which:

FIGS. 7 and 8 present schematic views of power distribution networks that can also operate as communication networks for electrochromic windows according to various embodiments.

DETAILED DESCRIPTION

Electrochromic Devices

Various embodiments disclosed herein relate to improved window control and/or network configurations for electrochromic windows. The disclosed network configurations and window control methods can in many cases be used to minimize the overall power capacity of a power distribution network and thereby reduce the capital and/or operating costs of an electrochromic window installation. These benefits can be achieved by, for example, minimizing the amount of wiring needed to connect all the relevant windows, minimizing loss of power over the power delivery lines, maintaining the network and equipment thereon within a particular class/rating, and/or minimizing the number of control boxes used to power the windows. One advantage of the disclosed techniques is that a network of electrochromic windows can be designed to operate at a relatively lower peak input power, which may avoid the need for more expensive infrastructure and equipment. Another advantage is that networks designed according to the disclosed techniques are more flexible/adaptable, and can therefore, e.g., 1) accept additional windows (after an initial installation) with minimal rewiring and infrastructure changes, 2) manage power delivery on the network by dynamically changing the distribution of available power to suit varying demand, 3) deliver power to electrochromic windows in the network and/or external systems such as power grids or other building systems, and 4) store power in energy wells of the network, which allows, e.g., continued use of the electrochromic windows during power shortages e.g., when power supplies in the network fail and/or external power to the network fails or is diminished, and less substantial cabling and reliance on external power for switching windows in the network.

Figure 1:
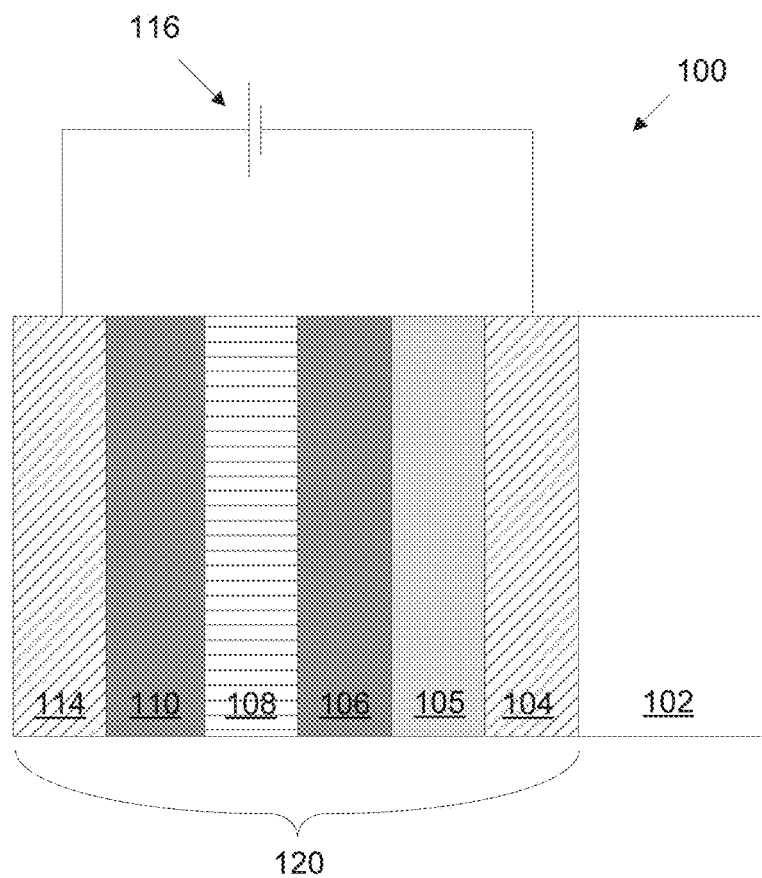
FIG. 1 illustrates a cross sectional view of an electrochromic device according to certain embodiments.

A schematic cross-section of an electrochromic device 100 in accordance with some embodiments is shown in FIG. 1. The electrochromic device includes a substrate 102, a conductive layer (CL) 104, a defect-mitigating insulating layer (DMIL) 105, an electrochromic layer (EC) 106 (sometimes also referred to as a cathodically coloring layer or a cathodically tinting layer), an ion conducting layer or region (IC) 108, a counter electrode layer (CE) 110 (sometimes also referred to as an anodically coloring layer or anodically tinting layer), and a conductive layer (CL) 114. Elements 104, 105, 106, 108, 110, and 114 are collectively referred to as an electrochromic stack 120. A voltage source 116 operable to apply an electric potential across the electrochromic stack 120 effects the transition of the electrochromic device from, e.g., a clear state to a tinted state. In other embodiments, the order of layers is reversed with respect to the substrate. That is, the layers are in the following order: substrate, conductive layer, defect-mitigating-insulating layer, counter electrode layer, ion conducting layer, electrochromic material layer, conductive layer.

In various embodiments, the ion conductor region 108 may form from a portion of the EC layer 106 and/or from a portion of the CE layer 110. In such embodiments, the stack 120 may be deposited to include cathodically coloring electrochromic material (the EC layer) in direct physical contact with an anodically coloring counter electrode material (the CE layer). The ion conductor region 108 (sometimes referred to as an interfacial region, or as an ion conducting substantially electronically insulating layer or region) may then form where the EC layer 106 and the CE layer 110 meet, for example through heating and/or other processing steps, as explained in U.S. Pat. No. 8,765,950, which is herein incorporated by reference in its entirety.

In various embodiments, one or more of the layers shown in FIG. 1 may be deposited to include two or more sublayers. In one example, the EC layer 106 and/or the CE layer 110 may be deposited to include two or more sublayers. The sublayers within a given layer may have different compositions and/or morphologies. The sublayers may be included to promote formation of the ion conducting region 108 and/or to tune various properties of the electrochromic device 100.

Further, an electrochromic device may include one or more additional layers not shown in FIG. 1. Such layers may improve optical performance, durability, hermeticity, and the like. Examples of additional layers that may be used include, but are not limited to, anti-reflective layers, additional defect-mitigating insulating layers (which may be provided within or between any of the layers shown in FIG. 1), and/or capping layers. The techniques disclosed herein are applicable to a wide variety of electrochromic device designs.

In certain embodiments, the electrochromic device reversibly cycles between a clear state and a tinted state. In the clear state, a potential is applied to the electrochromic stack 120 such that available ions in the stack that can cause the electrochromic material 106 to be in the tinted state reside primarily in the counter electrode 110. When the potential on the electrochromic stack is reversed, the ions are transported across the ion conducting layer 108 to the electrochromic material 106 and cause the material to enter the tinted state.

It should be understood that the reference to a transition between a clear state and tinted state is non-limiting and suggests only one example, among many, of an electrochromic transition that may be implemented. Unless otherwise specified herein, whenever reference is made to a clear-tinted transition, the corresponding device or process encompasses other optical state transitions such as non-reflective-reflective, transparent-opaque, etc. Further, the terms "clear" and "bleached" refer to an optically neutral state, e.g., untinted, transparent or translucent. Still further, unless specified otherwise herein, the "color" or "tint" of an electrochromic transition is not limited to any particular wavelength or range of wavelengths. As understood by those of skill in the art, the choice of appropriate electrochromic and counter electrode materials governs the relevant optical transition.

In certain embodiments, all of the materials making up electrochromic stack 120 are inorganic, solid (i.e., in the solid state), or both inorganic and solid. Because organic materials tend to degrade over time, inorganic materials offer the advantage of a reliable electrochromic stack that can function for extended periods of time. Materials in the solid state also offer the advantage of not having containment and leakage issues, as materials in the liquid state often do. It should be understood that any one or more of the layers in the stack may contain some amount of organic material, but in many implementations one or more of the layers contains little or no organic matter. The same can be said for liquids that may be present in one or more layers in small amounts. It should also be understood that solid state material may be deposited or otherwise formed by processes employing liquid components such as certain processes employing sol-gels or chemical vapor deposition. Information related to the various layers of the electrochromic device, including information related to the deposition thereof, is presented in U.S. application Ser. No. 12/645,111, filed Dec. 22, 2009, and titled "FABRICATION OF LOW DEFECTIVITY ELECTROCHROMIC DEVICES," which is herein incorporated by reference in its entirety.

Electrochromic devices can be incorporated into insulated glass units (IGUs) having two or more panes, typically separated by a spacer and sealed together through various sealing components. In one example, an IGU includes a first pane having an electrochromic device deposited thereon, a second pane (which may or may not have an electrochromic device thereon), a spacer positioned between the panes and proximate the periphery of the panes, a primary seal between the spacer and each pane, and a secondary seal that surrounds the spacer and primary seals. The IGU may be installed in a frame. The IGU may also include wiring to power the electrochromic device, various sensors, a window controller for controlling transitions of the electrochromic device, and other components. Electrochromic IGUs are further discussed and described in U.S. Pat. No. 8,213,074, and in U.S. patent application Ser. No. 14/951,410, filed Nov. 24, 2015, and titled "SELF-CONTAINED EC IGU," each of which is herein incorporated by reference in its entirety.

Networks

Introduction

Two or more electrochromic windows may be connected on a network. The network may be used to distribute power and/or control information/communication to the various windows in the network. A number of different network configurations are possible.

Figure 2:
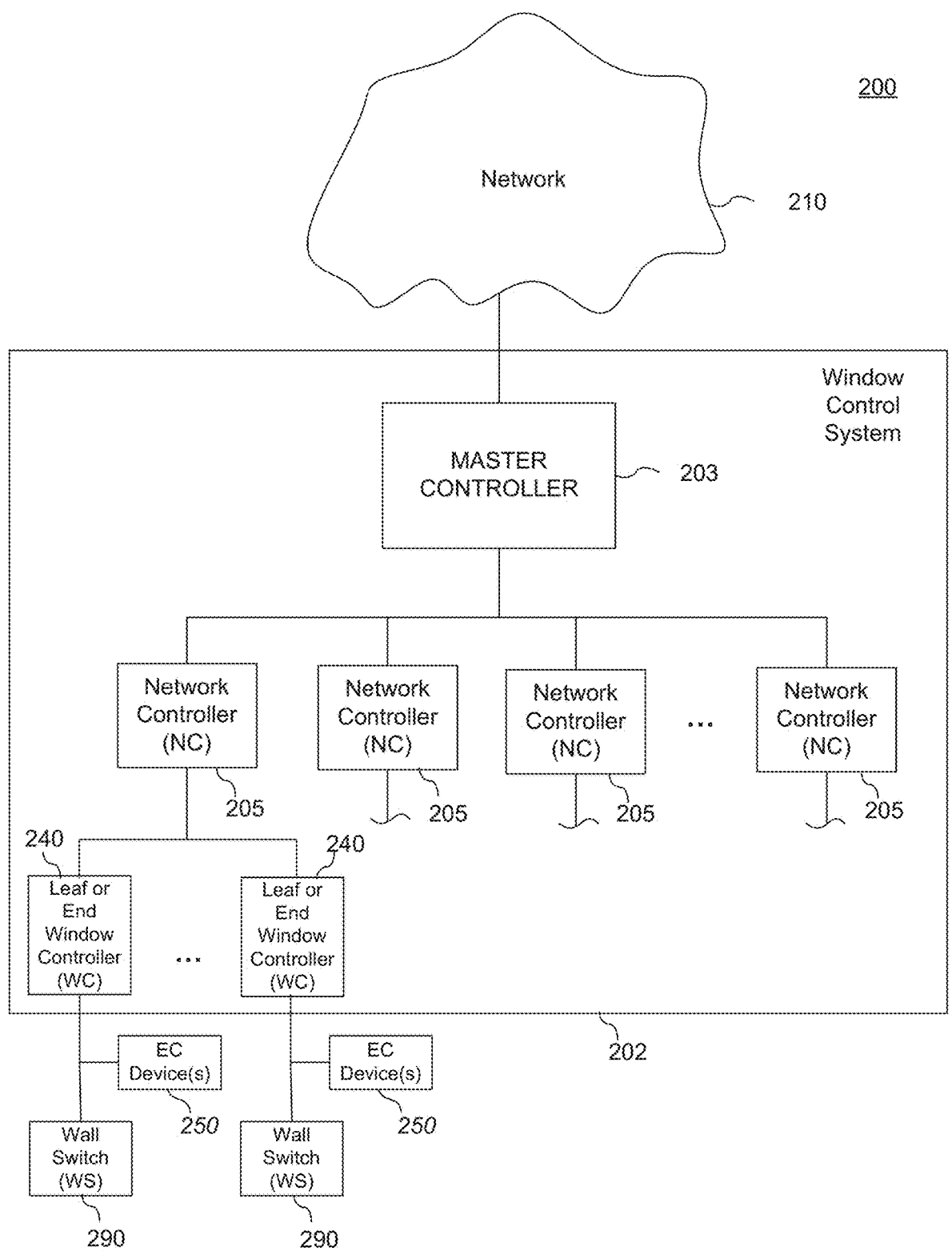
FIG. 2 is a diagram of components of a power distribution and communication network for controlling functions of one or more tintable windows of a building.

FIG. 2 is a block diagram of components of a window network system 200 for controlling functions (e.g., transitioning to different tint levels) of one or more tintable windows at a site (e.g., a building), according to various embodiments. Although the description of FIG. 2 focuses primarily on distribution of control information, it should be understood that some or all of the network shown may also serve to distribute power. In sections of the communications network that overlap with the power distribution network, a single conductor may be used to deliver power (as in power-line communications), or separate lines may be used to deliver power and communications, though infrastructure such as conduits may be shared between these separate lines. System 200 may be one of the systems managed by a window system through a building management system (BMS) or may be managed directly by a window system and/or operate independently of a BMS.

System 200 includes a window control system 202 that can send control signals to the tintable windows to control their functions. System 200 also includes a network 210 in electronic communication with window control system 202, and a power source (not shown) for providing power to the individual components on the network. Control logic and instructions for controlling functions of the tintable window(s), and/or sensor data may be communicated to the window control system 202 through the network 210. Network 210 can be a wired or a wireless network (e.g., a cloud network). In some embodiments, network 210 may be in communication with a BMS (e.g., over an API) to allow the BMS to send instructions for controlling the tintable window(s) through network 210 to the tintable window(s) in a building. In some cases, the BMS may be in communication with the window system to receive instructions for controlling the tintable window(s) from the window system. In other embodiments, network 210 may be in communication with a window system to allow the window system to send instructions for controlling the tintable window(s) through network 210 to the tintable window(s) in a building. In certain embodiments, the window control system 202 and/or the master controller 203 are designed or configured to communicate with the window system or a component thereof such as a data warehouse.

System 200 also includes EC devices 250 of the tintable windows and wall switches 290, which are both in electronic communication with window control system 202. In this illustrated example, window control system 202 can send control signals to EC device(s) 250 to control the tint level of the tintable windows having the EC device(s) 250. Each wall switch 290 is also in communication with EC device(s) 250 and window control system 202. An end user (e.g., occupant of a room having the tintable window) can use the wall switch 290 to control the tint level and other functions of the tintable window having the EC device(s) 250.

In FIG. 2, window control system 202 is depicted as a distributed network of window controllers including a master controller 203, a plurality of network controllers 205 in communication with the master controller 203, and multiple pluralities of end or leaf window controllers 240. Each plurality of end or leaf window controllers 240 is in communication with a single network controller 205. Although window control system 202 is illustrated as a distributed network of window controllers, window control system 202 could also be a single window controller controlling the functions of a single tintable window in other embodiments. Each of the window controllers in the distributed network of FIG. 2 may include a processor (e.g., microprocessor) and a computer readable medium (e.g., a memory device configured to store digital information) in electrical communication with the processor.

In FIG. 2, each leaf or end window controller 240 is in communication with EC device(s) 250 of a single tintable window to provide power and control the tint level of that tintable window in the building. In the case of an IGU, the leaf or end window controller 240 may be in communication with EC devices 250 on multiple lites of the IGU to control the tint level of the IGU. In other embodiments, each leaf or end window controller 240 may be in communication with a plurality of tintable windows. The leaf or end window controller 240 may be integrated into the tintable window or may be separate from the tintable window that it controls.

Each wall switch 290 can be operated by an end user (e.g., occupant of the room) to control the tint level and other functions of the tintable window in communication with the wall switch 290. The end user can operate the wall switch 290 to communicate control signals to the EC devices 250 in the associated tintable window. These signals from the wall switch 290 may override signals from window control system 202 in some cases. In other cases (e.g., high demand cases), control signals from the window control system 202 may override the control signals from wall switch 290. Each wall switch 290 is also in communication with the leaf or end window controller 240 to send information about the control signals (e.g., time, date, tint level requested, etc.) sent from wall switch 290 back to window control system 202. In some cases, wall switches 290 may be manually operated. In these or other cases, wall switches 290 may be wirelessly controlled by the end user using a remote device (e.g., cell phone, tablet, etc.) sending wireless communications with the control signals, for example, using infrared (IR), and/or radio frequency (RF) signals. In some cases, wall switches 290 may include a wireless protocol chip, such as Bluetooth, EnOcean, WiFi, Zigbee, LiFi, and the like. Briefly, LiFi refers to Light Fidelity, which is a bidirectional, high-speed and networked wireless communication technology similar to WiFi. LiFi utilizes a light signal (e.g., visible light, infrared light, near-ultraviolet light, etc.) to convey information wirelessly. The light signal may be sufficiently rapid and/or dim for human perception, though such signals can be easily perceived by appropriate receivers. In some cases, the LiFi signal may be generated by one or more light emitting diode (LED), which may be coated with (or otherwise include) a material that allows for high data transmission rates. Example materials may include perovskites. One particular example material is cesium lead bromide ($CsPbBr_3$), which may be provided in nanocrystalline form. In various embodiments, control signals (e.g., between a wall switch 290 and a component on the window control system 202 such as an end or leaf window controller 240, or between any of the components on the window control system 202) may be transferred via LiFi. To this end, any of the switches, controllers, electrochromic windows, and other components of the system may include appropriate transmitters and/or receivers for transmitting and/or receiving communication signals, including Bluetooth, EnOcean, WiFi, Zigbee, LiFi, and similar signals. Although wall switches 290 depicted in FIG. 2 are located on the wall(s), other embodiments of system 200 may have switches located elsewhere in the room.

Wireless communication between, for example, master and/or network controllers and end window controllers offers the advantage of obviating the installation of hard communication lines. This is also true for wireless communication between window controllers and BMS. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments. Logic for implementing the methods described herein, including but not limited to methods for prioritizing transition of certain windows over others, and methods for altering the transition parameters for windows transitioning under certain limited power availability conditions, may be provided on any of the controllers and control systems described herein. For instance, such logic may be provided on a window control system, a master controller, a network controller, a window controller, or some combination thereof. In various embodiments, there is a communicative connection between a window controller, which controls transitions on one or more electrochromic windows, and a network controller and/or window controller, for example as illustrated in FIG. 2. Logic for initiating and controlling transitions on one or more electrochromic windows may be provided on the master controller and/or network controller, which may feed the instructions to the window controller for execution on the one or more electrochromic windows. In one embodiment, the logic is provided on one or more network controllers, which feed the instructions to the window controllers. In another embodiment, the logic is provided on one or more master controllers, which feed the instructions to the network controllers, which feed the instructions to the window controllers. Generally speaking, there may be a communicative relationship between a window controller and one or more higher level or central controllers (which may be implemented as one or more network controllers and/or one or more master controllers, for instance). This communicative relationship may be used to transfer control information among the various controllers, as desired.

The references to a BMS in the above description can be replaced in some or all instances with references to a smart thermostat service or other home appliance service such as NEST. The communication between the window system and the BMS or home appliance service can be via an API as described above.

Power Considerations

One of the primary considerations when designing a network of electrochromic windows is the power requirements of such windows. The power delivered over the network will be greatest if/when all or a large portion of the windows on the network are directed to undergo an optical transition at the same time. Where this is the case, the network may be understood to be delivering "peak power." Peak power delivery occurs relatively rarely on most systems, and the power used by a system at any time may be on the order of about 10% of the peak power. This is because rarely do all the windows need to transition at the same time, e.g., different zones of windows on different sides of a building or different elevation on the same side will often be tinted at different times. However, because there may be occasions where peak power delivery is wanted or needed, a power distribution network is conventionally designed to deliver such power on demand. Examples where peak power delivery may be needed include cases where there is a security situation (e.g., where all interior and/or exterior windows may be tinted to prevent a potential security threat from seeing into/through the windows, or where all interior and/or exterior windows may be made transparent to minimize the opportunity for a potential security threat to hide), cases where windows are simultaneously tinted or untinted to demonstrate the functionality of the windows/building (e.g., during a commissioning phase after installation), cases where electrochromic windows are used in an artistic exhibition, cases where all or many building windows must rapidly transition to a protected state (e.g., all clear) in anticipation of an emergency situation where a local power utility cannot keep up with demand, etc. Such emergencies may relate to blackouts, brownouts, etc. Outside of such situations, peak power delivery is typically not needed, and a relatively lower amount of power is delivered to the electrochromic windows on the network. Moreover, conventional electrochromic window installations are designed with a set number of windows in mind, i.e., the power distribution network for the windows is designed and built for a specific number of windows that are initially installed, thus it is not designed for later expansion of the number of windows connected to the network. As well, conventional electrochromic window installations may include networks that are "over engineered," i.e., designed with peak load in mind, while peak load is rarely a reality over the life of the system. Embodiments described herein allow for more modest power distribution networks that, while still able to provide peak power delivery, generally require less costly infrastructure than convention systems and are more flexible than conventional systems when it comes to powering schemes.

Even if there is not a specific need for the system to transition all the windows at the same time, an operator may direct the system to do so. Therefore, the network should be capable of executing an instruction to simultaneously drive an optical transition in all the electrochromic windows. The execution of this instruction may involve actually transitioning all the windows at once, or it may involve directing the windows to change sequentially within a short period of time.

Power management for the network involves balancing the supply and demand of available power. In various embodiments, the supply and/or demand of available power may be controlled in a way that minimizes the maximum rate at which power is input to the system. The disclosed techniques can be used to design a power distribution network for electrochromic windows that has lower power input requirements than would otherwise be required. These techniques may minimize cost, for example by avoiding the need for equipment designed to operate at higher peak power delivery, minimizing the amount of wiring, etc.

Managing Supply of Available Power

One of the techniques for managing power distribution over a network of electrochromic windows is to manage the supply of energy available for driving optical transitions. In some conventional networks, several electrochromic windows may be driven by a single control panel (sometimes also referred to as control boxes, power supplies, power sources, etc.), which typically provides all the power used to drive optical transitions on the windows. A building may be equipped with multiple control panels, which may deliver both power and control information. In some cases there may be one control panel per floor, or one control panel per region of the building. The number of electrochromic windows that may be driven by a single control panel may be determined by the power needed to drive each window and the maximum power deliverable by the control panel. The number of electrochromic windows that may be driven on a single power line may further depend on line loss, which is affected by the voltage being carried over the line and the distance of the line. Where a set of windows draws (or attempts to draw) a greater amount of power than can be delivered, the circuit on which the windows are placed may be tripped and the window transitions may fail.

Figure 3:
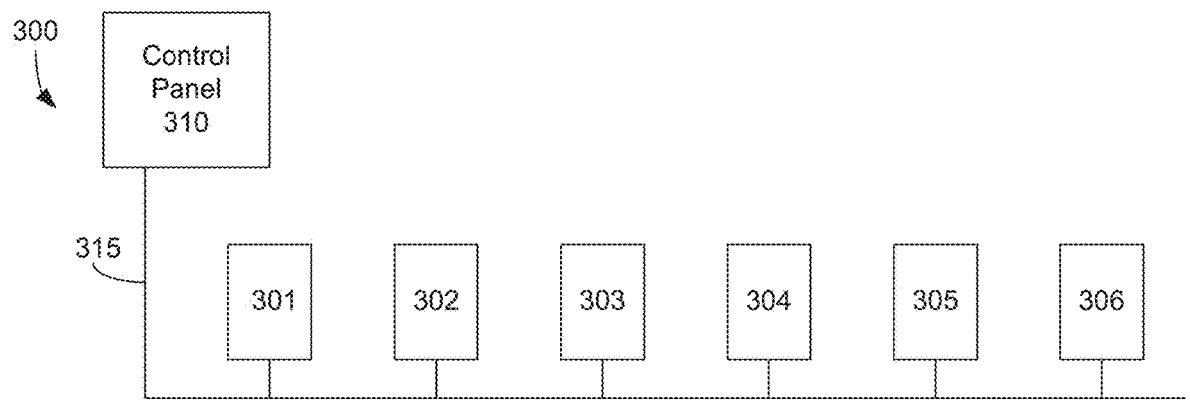
FIG. 3 presents a power distribution network for electrochromic windows according to certain implementations.

FIG. 3 presents a simplified view of a power distribution network 300 including a series of electrochromic windows 301-306 each driven by a control panel 310. A trunk line 315 connects all of the windows 301-306 to the control panel 310, and may carry power, communication information, or both. In some cases, the power required to drive simultaneous optical transitions in the windows 301-306 may exceed the power that can be delivered by the control panel 310 over a single line. As such, an additional power line may be provided to power certain windows. This additional power line may be required as additional electrically switchable windows are added after an initial installation.

Figure 4:
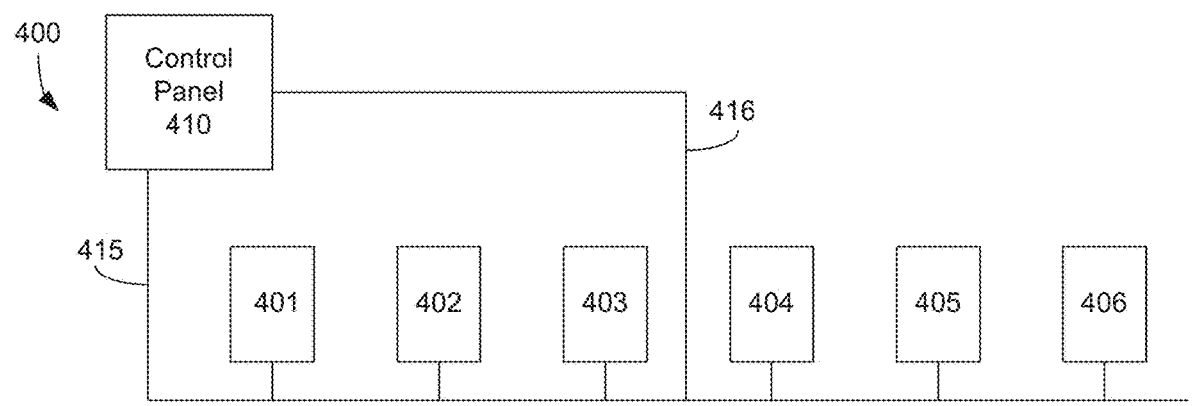
FIG. 4 presents a power distribution network for electrochromic windows that includes an additional power delivery line.

FIG. 4 presents a simplified view of a network 400 that includes a series of electrochromic windows 401-406, each driven by control panel 410. Here, two lines are provided to bring power to the windows from control panel 410. A first line 415 may power a first set of windows 401-403, and a second line 416 may power a second set of windows 404-406. However, network 400 is still limited by the power output of the control panel 410. The lines 415 and 416 may be segmented with respect to power delivery, with the different lines powering different sets of windows, as shown. Communication (e.g., control information) may be transmitted in any fashion. In one example communication occurs wirelessly. In another example, communication may be transmitted through separate lines not shown in the figures. In other cases, power-line communications protocols may be used to transmit both power and data over a single conductor line. For example, line 415 may carry both power and communications for all the windows 401-406, or for windows 401-403. In another example, line 415 may transmit communication information for windows 401-406, and may transmit power for windows 401-403 (with line 416 providing power for windows 404-406). In yet another example, communication may be transmitted through both lines 415 and 416. Each of the lines 415 and 416 may include multiple wires for carrying power and/or communication.

In certain implementations, power storage units (often referred to herein as "energy wells") may be provided along the power lines. In some examples, the energy wells may be provided along a trunk line that connects two or more of the windows to a control panel or other power source. The energy wells can provide power to drive optical transitions on one or more windows. The energy wells effectively increase the peak power available for delivery by the system because energy can be delivered from both the control panel(s) and the energy well(s) simultaneously. The energy wells can be recharged when there is excess power available on the network (e.g., when the windows are not changing tint state such as night or when the power being used to drive the windows is less than the power that can be delivered by the control panel or other power supply). Analogously, with energy wells in the power distribution network, less total power is required for the incoming power to the system, because of the augmented power available from the energy wells. Thus, wiring for the distribution network may be less or of smaller gauge and/or power requirements and/or have less duplication or redundancy that otherwise might be necessary (e.g., as described in relation to FIG. 4 (though some extra power line connections may be advantageous for other reasons in distribution networks with energy wells)).

One embodiment is a class 2 power network for electrochromic windows, where the power network includes one or more energy wells. The one or more energy wells are distributed or otherwise located between the power supply (often provided in the control panel) and the electrochromic windows of the system. That is, the one or more energy wells are downstream of the power supply and upstream of the electrochromic window, e.g., upstream of the electrochromic window controller or otherwise not part of the window assembly.

In conventional electrochromic window networks, power input into the network closely corresponds in time and magnitude with power delivered by the network. The power input into the network refers to the power drawn by the network from a main power source (e.g., via control panel(s) or other source(s) within the facility, in some cases from the power grid). The power delivered by the network refers to the power provided to the individual windows/window controllers (and any related components) to drive optical transitions on the windows (or in some cases, also including extra power that is supplied to other building systems or to a power grid). In conventional electrochromic window networks, these are largely the same (except for losses occurring due to, e.g., line loss). As such, the maximum power that can be delivered to the windows is limited by the maximum power that can be input into the system from the main power source. However, the use of energy wells allows for these power transfers to be decoupled to some extent. In this way, the maximum power delivered to the windows can exceed the maximum power input into the system at a given time. Therefore, networks that utilize energy wells can achieve a higher peak delivered power than similar networks that do not utilize such energy wells, and they can do this without being "over engineered" (e.g., without using larger or more power supplies than are needed using the methods/configurations described herein).

One advantage of the use of energy wells is that electrochromic window networks can be designed to operate at lower peak input power than would otherwise be required. The peak input power in such cases may be lower than the power required to simultaneously tint or untint all the electrochromic windows on the network, while the peak output power may still be sufficiently high to simultaneously tint or untint all the windows. For example, though the described power networks are able to deliver peak power load to the windows of the system, the power supply(ies) feeding the system may not be able to do so, and need not be able to do so. Further, power networks described may be configured to deliver greater than peak output, which allows for future expansion of the network of electrochromic windows, e.g., adding more windows to the system without having to upgrade the power network, and allows, e.g., the system to transition all the windows in the system and supply extra power to external systems if need be, at least for some period of time. The power network can be recharged during non-peak load periods. As used herein, the term "power source" includes both power supplies (and any component in which a power supply is provided, e.g., a control panel) in the conventional sense, as well as the described energy wells. Conventional power supplies are electronic devices that supply electric energy to an electrical load, and typically convert energy from one form of electrical energy to another. A power supply includes a power input, which receives energy from an energy source (e.g., the power grid), and a power output, which delivers energy to the load. The energy wells and power supplies can provide the power for transitioning the electrochromic windows as directed, either separately or together. Because the energy wells may be recharged via energy delivered from the power supply(ies), the power supplies may also be considered power sources for the energy wells.

Figure 5:
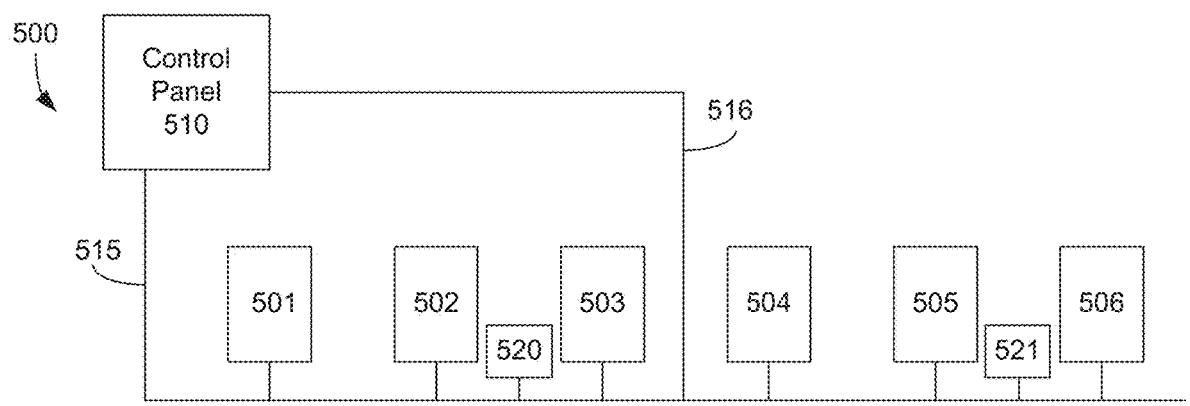
FIG. 5 presents a power distribution network for electrochromic windows that includes an additional power delivery line and additional energy storage units.

FIG. 5 presents a simplified view of a network 500 that includes a series of electrochromic windows 501-506 connected by a first power line 515 and a second power line 516. The power lines may be segmented as described in relation to FIG. 4. Communication may occur through any available means, for example as described in relation to FIG. 4. Two energy wells 520 and 521 are included in the embodiment of FIG. 5. In one example, control panel 510 is only capable of simultaneously powering transitions in two windows per individual power line (in various embodiments this number may be significantly higher). When a command is received to simultaneously drive an optical transition in all of the windows 501-506, the control panel 510 may drive the transitions by delivering power to windows 501 and 502 through the first power line 515 and to windows 504 and 505 through the second power line 516. Power may be delivered to window 503 by energy well 520, and to window 506 by energy well 521. After the transition, the energy wells 520 and 521 may be recharged, for example through power lines 515 and 516. In other embodiments, the combination of power from control panel 510 and energy wells 520 and 521 is used, collectively, to power the transitions of windows 501-506, i.e., the energy may be distributed to all the windows without any particular designation as to which source powers which windows. Thus, utilizing one or more power supplies (which may be provided in control panels), with one or more energy wells, allows for distributed power along a network, the distributed power may be utilized in a number of ways.

In the embodiment of FIG. 5, all or nearly all of the windows may undergo simultaneous optical transitions even though the control panel 510 is not capable of providing sufficient power to drive the transitions simultaneously by itself; the power network includes energy wells and thus, collectively, the network has sufficient power. In some embodiments, the network is configured to use only power that is provided from the energy wells, i.e., power supplies are specifically not used to deliver power (even though such power supplies may be physically present). Such power delivery from the energy wells alone may be particularly useful during power outages (which may be intentional or unintentional, an intentional outage would be e.g., where maintenance is taking place) or when the power supplies are configured to deliver power to alternative building systems.

In various embodiments, the network may be configured to utilize energy-well-only power delivery in the event of a power outage, and to utilize power delivery from any available power source (e.g., power supplies and/or energy wells) or combination of power sources in non-power-outage situations.

Power networks with energy wells allow the control panel(s) to have a lower maximum power output than would otherwise be needed to drive all the windows simultaneously if no such energy wells were provided. Returning to the embodiment of FIG. 5, because the control panel 510 can have a relatively lower maximum power output, the control panel 510 may not need as many safeguards as are needed for higher output panels. Further, the control panel may be less expensive than it otherwise would be, if made to supply peak load output on its own.

Any type of local energy storage may be used for the energy wells. Examples include supercapacitors and batteries, which may be provided in the form of uninterruptible power supplies (UPSs). Battery energy wells may take various forms, e.g., a rechargeable battery, storage battery, secondary cell, or accumulator, which can be charged, discharged into a load, and recharged many times. The term "accumulator" is used as it accumulates and stores energy through a reversible electrochemical reaction. Rechargeable batteries are produced in many different shapes and sizes, ranging from button cells to megawatt systems connected to stabilize an electrical distribution network. Examples of different combinations of electrode materials and electrolytes may be used, including lead acid, nickel cadmium, nickel metal hydride, lithium ion, nickel zinc, and lithium ion polymer. In certain embodiments, an energy well of the power network is replaceable, modular format, that can be easily accessible for maintenance, if needed.

The energy wells may provide sufficient power to drive one or more optical transitions in one or more windows. In some cases, an energy well may provide sufficient power to drive an optical transition in as many as about 1, 2, 3, 5, 7, 10, or 12 windows simultaneously. The energy well can discharge at a rate sufficient to drive optical transitions in the relevant window(s) in its domain. The energy well may be capable of providing a particular voltage sufficient to drive optical transitions in the relevant window(s). In various cases the energy well may discharge at a voltage of about 24 V. The power provided to the energy well may be DC power in many cases. In some embodiments the energy well may include a voltage converter for increasing or decreasing the voltage provided to the energy well. In other cases the energy well outputs power at the same voltage at which it is received. In certain cases, the energy well may be rated as a class 1 or a class 2 device.

In certain embodiments, an energy well can be an inline system, i.e., a modular format battery pack that installs into a trunk line or drop cable of the network. For example, one form of trunk line component is a trunk line cable with, e.g., a dock station. Similarly, a drop line may be provided with such a dock station. A rechargeable battery pack is configured to mate with the dock station. A supercapacitor energy well may also be provided in such a format, though dock stations are particularly beneficial in the case of battery packs because batteries tend to degrade over time and are more likely to need replacement compared to supercapacitors. The battery pack (or other energy storage used for the energy well) and/or docking station may have electronic circuitry for directing power to and from the battery pack into and out of the trunk line (or, if the docking station is provided in a drop line, for directing power into and out of the drop line) to feed the power network. The electrical circuitry may include control logic for deciding when and how much power to deliver to the network, and for example may receive instructions from a network and/or a master controller. Additionally, the electrical circuitry may include charging circuits that modulate how the battery pack (or other energy storage used for the energy well) is recharged, e.g., having a fast charge mode and a trickle charge mode. The circuitry may also include upgrade capability, e.g., built into the circuitry so that newer battery technology (or other energy storage technology) may be used in the future, or e.g., the circuitry itself may be a modular unit that can be replaced when upgrades to it and/or the battery pack (or other energy storage) are desired. Thus in this respect, a power network as described herein may be upgradeable, e.g., to increase total power output, by changing the energy wells and/or associated circuitry, whether modular or not, without changing other components such as control panels, drop cables or other hardware. In one embodiment, a power network is upgraded to a higher peak output power simply by changing out one or more energy wells (which may be battery packs, supercapacitors, or other energy storage mechanisms). This adds a great deal of flexibility in systems, e.g. when more windows are added to a network, batteries may be upgraded without having to change anything else in the system.

The National Electrical Code (NEC) is a regionally adoptable standard providing guidelines for safe installation of electrical wiring and equipment in the US. The code is published by the National Fire Protection Association (NFPA), which is a private trade association. Although the code is not national law, it has been adopted by many states and municipalities, sometimes with amendments. The NEC defines various circuit classifications and provides limitations on the specifications of such circuits. Broadly, the NEC defines class 1, class 2, and class 3 circuits. The NEC further defines subcategories within these classes. For example, within the class 1 circuits, the NEC distinguishes between power-limited circuits (which are limited to 30 V, 1000 V·A, and include a current limiter on the power source) and remote-control and signaling circuits (which are limited to 600 V and include limitations on the power output of the source). For class 1 power-limited circuits, an overcurrent protection device (OCPD) restricts the amount of supply current on the circuit to protect the circuit in the case of an overload, short circuit, or ground-fault. The use of class 1 components may involve special considerations with respect to safety. For example, cabling provided in a class 1 circuit may need to be specially rated class 1 cable, or it may need to be run in an appropriate conduit or metal raceway.

With respect to class 2 circuits, the NEC imposes limits based on whether the circuit is inherently limited (requiring no overcurrent protection) or not inherently limited (requiring a combination of power source and overcurrent protection). In a number of cases, class 2 circuits may be limited to 30 V and 100 V·A. Wiring in a class 2 circuit is inherently safer than in a class 1 circuit, and fewer precautions are needed. For instance, cabling that is rated class 2 can be provided without the protections inherent to class 1 wiring, and does not need to be provided in a conduit/raceway.

The energy wells described herein, as well as other components such as control panels/power supplies and cabling, may be designed to satisfy the conditions listed in the NEC with respect to class 1 or class 2 power supplies/circuits, depending on the particular installation needs.

One example of an energy well that may be used as described herein is a supercapacitor. In certain embodiments, a supercapacitor used as an energy well has sufficient energy and power to drive a single optical transition (e.g., tinted to clear or vice versa) on an associated electrochromic window. The energy well may be integrated into the associated electrochromic window, for example as a part of an individual window controller. In some other cases, the energy well may be separate from the windows and window controllers, positioned at some point (or multiple points) along the power distribution network at a location where it can be used to provide power to one or more windows on the network. As mentioned above, in certain embodiments the energy well(s) may be installed along a trunk line, or on drop lines that connect the window controllers to the trunk line. Supercapacitors may be deployed for discharge in scenarios where high power but relatively low capacity is needed such as driving a complete transition in a large electrochromic window, e.g., an electrochromic window having a dimension of at least about 50 inches. In some cases, batteries and supercapacitors are used together to complement one another. Batteries often store more energy than comparably sized supercapacitors, but deliver such energy at lower power than comparably sized supercapacitors. In various embodiments, the supercapacitor may be recharged over the course of about 4 minutes, or over the course of about 2 minutes, or in about 1 minute or less.

The recharging may be controlled to balance the needs of the system. For instance, if the network is currently using a lot of the available power to drive optical transitions in the windows, an energy well may remain uncharged until a time when there is sufficient excess power available to recharge the energy wells. Further, if the amount of available power is relatively low, the energy wells may be recharged at a relatively lower rate or in increments. Various energy wells may be charged simultaneously if sufficient power is available. In some cases, the energy wells may be recharged at different starting times if there is not sufficient power to simultaneously recharge all of the energy wells. In other words, the speed and timing of recharging may be controlled to promote optimal functionality of the electrochromic windows. In this way, a user can operate the windows as desired on demand, and the energy wells can be recharged at times that will not overtax the system.

One embodiment is an electrochromic window control system including algorithms and logic configured to recharge one or more energy wells in a power network. In one embodiment, the control system is configured to simultaneously charge one energy well in a first charging format, while charging a second energy well in a second charging format, different from the first charging format. For example, the first energy well is a super capacitor and the second energy well is a battery. Each will be charged in a different format due to their inherent differences in capacity, structure, and so on. In another example, both the first and the second energy wells are batteries, e.g., of the same type; however, one requires more charging than the other. The window control system can charge each of the first and second energy wells as needed, e.g., the first energy well may only need a trickle charge because it will not be needed for some time, based on scheduling, while the second energy well may need fast charging due to imminent window switching requirements. Just as the system may deliver power from power supplies to the energy wells at differential rates and formats, so can the system deliver power from the energy wells, at differential rates and formats, depending upon the demands put upon the power network. Thus, embodiments described herein provide much greater flexibility than conventional power networks for electrochromic windows.

The number of energy wells used in a particular network may depend on a number of factors including, for example, the maximum power provided by the control panel, the number of windows per control panel, how quickly the optical transitions are driven, the length of wiring connecting the control panel to the windows, the number of wires used to connect to all the windows, the energy capacity and power capacity of the energy wells, etc. Generally, the more energy that can be stored in and supplied by the energy wells, the less power output is needed from the control panel(s). However, the control panel(s) should have an output capacity sufficient to recharge the energy wells.

In some implementations, an energy well is provided for each electrochromic window on the network, or for substantially each electrochromic window on the network (e.g., at least about 95% of the electrochromic windows on the network). Such energy wells may be implemented as part of an electrochromic window. In other words, the energy well may be integrated into the window, for example integrated into an IGU. In some embodiments, an energy well may be included in a window controller, which may or may not be integrated into the window. In another implementation, a single energy well may supply power for a group of windows. For instance, at least one energy well may be provided for each n windows on the network, where n is between about 2 and about 100, or where n is between about 5 and about 50, or where n is between about 10 and about 30.

As mentioned, the use of energy wells can allow for a network to be designed using control panels/power supplies that operate at relatively lower power/voltage than would otherwise be needed to support the electrochromic windows at their peak power requirements. This may reduce the cost of electrochromic window networks, since the control panels/power supplies can be class 2 devices that do not require the electrical safeguards that are mandatory for non-class 2 power supplies (e.g., class 1 power supplies) providing higher power/voltage.

In certain embodiments, the control panel(s) in a power distribution network may all be class 2 devices. In some cases, one or more control panel(s) in a power distribution network may be a class 1 device. Various details related to class 1 and class 2 specifications are provided above and in the National Electric Code (NEC).

The use of energy wells helps manage the supply of power available to drive optical transitions on electrochromic windows on a network. Another technique for power management, which may be used in combination with the other techniques described herein, is to manage the demand for power as described further below.

Managing Demand for Available Power

Where electrochromic windows are provided on a network, power can be consumed by the windows, and sometimes their controllers, in a way that ensures that the windows will not draw a greater amount of power than is available. In some embodiments, the window power distribution network includes a normal demand procedure and a controlled demand procedure, with the latter reserved for situations that might otherwise require peak consumption and/or situations where the power supply is temporarily limited (e.g., when the local utility cannot keep up with demand or when there is a malfunction).

One or more controllers (e.g., master controllers, network controllers, and/or window controllers) may take various actions as described herein to manage demand for available power to ensure this result. Managing demand for available power relates to managing the amount of power that is drawn by the electrochromic windows and/or controllers on the network. There are a number of reasons that it may be beneficial to manage this demand. For instance, if the building experiences a power failure and the network only has a limited amount of power to work with (e.g., power stored in energy wells, power provided by a generator, etc.), a controller may take action to ensure that the windows do not draw a greater amount of power than is available. Further, the network may be designed such that the peak power delivered to the windows is less than the power required to simultaneously drive optical transitions in all the windows under normal transition parameters. In this case, a controller may take action to ensure that the windows do not draw too much power at a given time, for example by slowing the transitions and operating at lower power for each window, or by staggering or otherwise prioritizing the optical transitions such that the windows are not each drawing large amounts of power at the same time. Implementation of a sleep mode for the electrochromic windows and controllers may also help manage the demand for power on the network.

As explained, an optical transition of an electrochromic device may be controlled by a window controller. The window controller may receive instructions from a network controller. The controllers may be configured to apply a particular current profile and/or voltage profile when driving an optical transition on an electrochromic device. Current and/or voltage applied to the device can be controlled during various portions of the transition.

Figure 6:
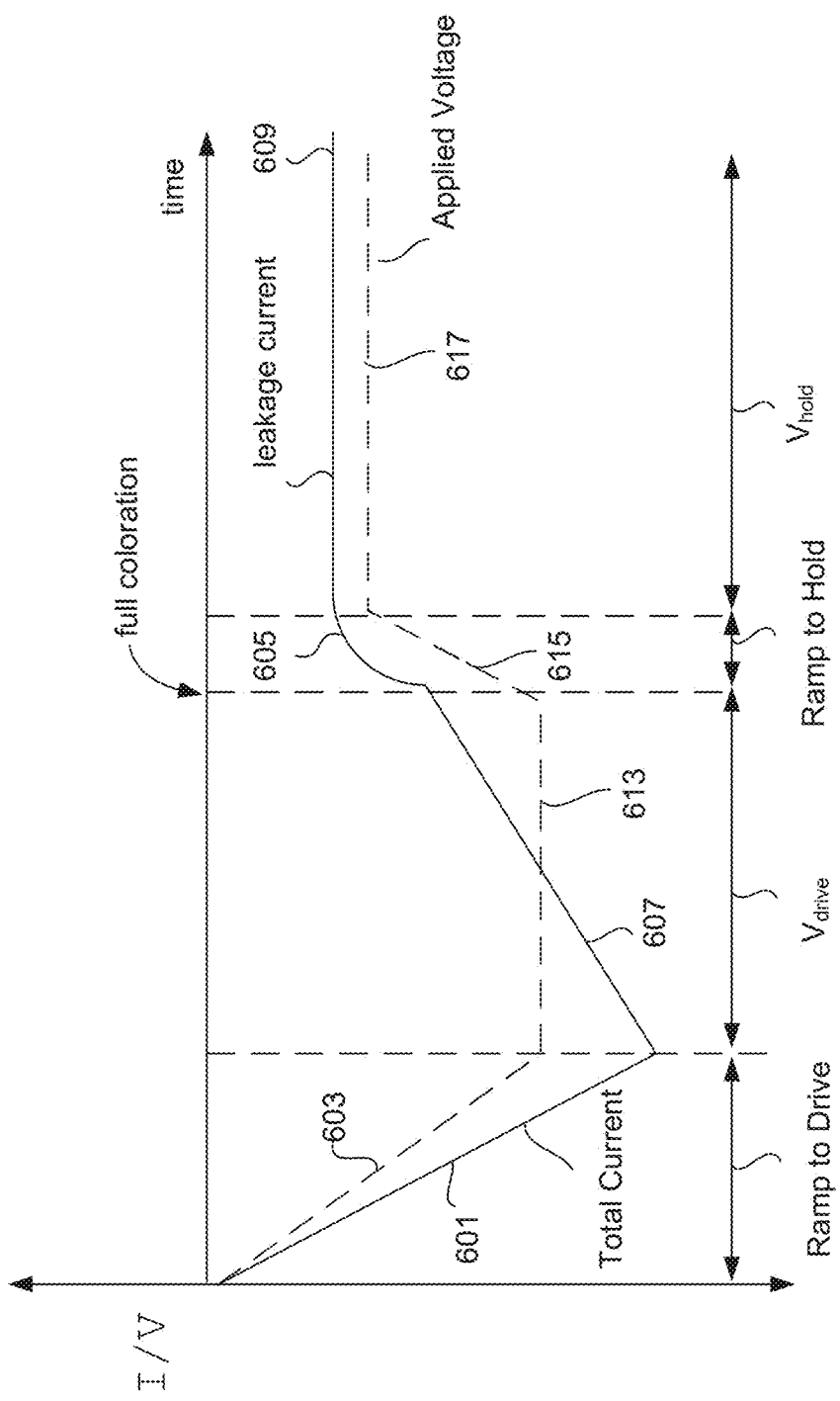
FIG. 6 shows current and voltage profiles that may be used to drive an optical transition in an electrochromic window in various embodiments.

FIG. 6 illustrates a voltage control profile in accordance with certain embodiments. In the depicted embodiment, a voltage control profile is employed to drive the transition from a clear state to a tinted state (or to an intermediate state). To drive an electrochromic device in the reverse direction, from a tinted state to a clear state (or from a more tinted to less tinted state), a similar but inverted profile may be used. In some embodiments, the voltage control profile for going from tinted to clear is a mirror image of the one depicted in FIG. 6.

The voltage values depicted in FIG. 6 represent the applied voltage ($V_{app}$) values. The applied voltage refers to the difference in potential applied to two bus bars of opposite polarity on the electrochromic device. The applied voltage profile is shown by the dashed line. For contrast, the current profile in the device is shown by the solid line. In the depicted applied voltage profile, $V_{app}$ includes four components: a ramp to drive component 603, which initiates the transition, a $V_{drive}$ component 613, which continues to drive the transition, a ramp to hold component 615, and a $V_{hold}$ component 617. The ramp components are implemented as variations in $V_{app}$ and the $V_{drive}$ and $V_{hold}$ components provide constant or substantially constant $V_{app}$ magnitudes.

The ramp to drive component is characterized by a voltage ramp rate (increasing magnitude) and a magnitude of $V_{drive}$. When the magnitude of the applied voltage reaches $V_{drive}$, the ramp to drive component is completed. The $V_{drive}$ component is characterized by the value of $V_{drive}$ as well as the duration of $V_{drive}$. The magnitude of $V_{drive}$ may be chosen to maintain $V_{eff}$ within a safe but effective range over the entire face of the electrochromic device. $V_{eff}$ refers to the "effective voltage," which is the potential between the positive and negative transparent conductive layers at any particular location on the optically switchable device. In Cartesian space, the effective voltage is defined for a particular x,y coordinate on the device. At the point where $V_{eff}$ is measured, the two transparent conducting layers are separated in the z-direction (by the device materials), but share the same x,y coordinate.

The ramp to hold component is characterized by a voltage ramp rate (decreasing magnitude) and the value of $V_{hold}$ (or optionally the difference between $V_{drive}$ and $V_{hold}$). $V_{app}$ drops according to the ramp rate until the value of $V_{hold}$ is reached. The $V_{hold}$ component is characterized by the magnitude of $V_{hold}$ and the duration of $V_{hold}$. Actually, the duration of $V_{hold}$ is typically governed by the length of time that the device is held in the tinted state (or conversely in the clear state). Unlike the ramp to drive, $V_{drive}$, and ramp to hold components, the $V_{hold}$ component has an arbitrary length, which is independent of the physics of the optical transition of the device.

Each type of electrochromic device will have its own characteristic components of the voltage profile for driving the optical transition. For example, a relatively large device and/or one with a more resistive conductive layer will require a higher value of $V_{drive}$ and possibly a higher ramp rate in the ramp to drive component. U.S. patent application Ser. No. 13/449,251, filed Apr. 17, 2012, and incorporated herein by reference, discloses controllers and associated algorithms for driving optical transitions over a wide range of conditions. As explained therein, each of the components of an applied voltage profile (ramp to drive, $V_{drive}$, ramp to hold, and $V_{hold}$, herein) may be independently controlled to address real-time conditions such as current temperature, current level of transmissivity, etc.

The voltage and current profiles shown in FIG. 6 are examples, and many other profiles may be used. In one example, open circuit conditions may be periodically applied to help monitor how far along an optical transition has progressed. Additional information related to driving and monitoring an optical transition is provided in PCT Patent Application No. PCT/US14/43514, filed Jun. 20, 2014, and titled, "CONTROLLING TRANSITIONS IN OPTICALLY SWITCHABLE DEVICES," which is herein incorporated by reference in its entirety.

In some embodiments herein, one or more components of an applied voltage profile (and/or current profile) may be controlled to manage the demand for power on a network of electrochromic windows. This technique may be particularly useful in cases where there is a power disruption or a related need to conserve power. This technique may also be useful in everyday operation, particularly where the network is not designed to support simultaneous full speed/full power optical transitions for all the electrochromic windows. As noted above in the section related to managing the supply of available power, there are a number of reasons why a system might be designed in this manner.

In order to transition a window using relatively less power, a number of options are available. For instance, the ramp to drive component and/or the ramp to hold component may be set relatively less steep, and/or the drive voltage may be set at a relatively lower magnitude value (closer to 0). These changes may increase the time period over which the transition occurs.

With reference to FIG. 3, in one example a network 300 having a control panel 310 includes windows 301-306. Each window 301-306 can undergo an optical transition over a duration of about 15 minutes under conditions where only some of the windows switch simultaneously. However, in this example, the control panel 310 cannot provide sufficient power to simultaneously power optical transitions in all of the windows 301-306 without experiencing a power failure (e.g., tripping the circuit). If and when a command is received to simultaneously switch the optical state of all the windows 301-306, one or more controllers on the network may direct the windows to switch optical states using an alternative set of transition parameters.

For instance, a controller may direct one or more of the windows to transition using a lower ramp to drive rate, a lower drive voltage, and/or a lower ramp to hold rate. This alteration in the transition parameters may allow all of the windows to transition simultaneously, though at a slightly slower rate. For example, whereas the individual windows could switch in about 15 minutes when driven at a first set of transition parameters, the windows may switch over a longer period, for example about 20 minutes, using a second set of transition parameters when all the windows are directed to switch simultaneously. Different sets of transition parameters can be defined for various power conditions. The power conditions may relate to the amount of power that is available to be supplied on the network compared to the amount of power that is in demand on the network.

In some cases, the first set of transition parameters may relate to a default set of transition parameters that are used when the supply of available power on the network is greater than the demand for power on the network. This first set of transition parameters may be optimized to provide fast switching or another desirable characteristic. A second set of transition parameters may relate to another set of parameters that may be used when the supply of available power on the network is less than the demand for power on the network. In this case, the second set of transition parameters may be optimized to conserve power, for instance by transitioning the windows at a slower rate and effectively lowering the demand for power. Any number of sets of parameters can be defined for various particular power conditions.

In certain embodiments, there may be particular quantitative differences between the transition parameters used for a default mode and those used for a power conservation mode. For example, the magnitude of the maximum ramp rate (V/s) experienced during a ramp to drive portion of a transition (e.g., see 603 in FIG. 6) under the default mode may be at least a certain degree greater than the magnitude of the maximum ramp rate experienced during a ramp to drive portion of a similar transition under the power conservation mode. The magnitude of the ramp rate during the ramp to drive portion of the transition may be at least about 5% higher (e.g., 10% higher, 20% higher, 30% higher, 40% higher, or 50% higher) for the default mode than for the power conservation mode. Similarly, the magnitude of the drive voltage ($V_{drive}$) during the drive component of a transition (e.g., see 613 in FIG. 6) under the default mode may be at least a certain degree higher than the magnitude of the drive voltage during the drive component of the transition under the power conservation mode. The magnitude of the drive voltage may be at least about 5% higher (e.g., 10% higher, 20% higher, 30% higher, 40% higher, or 50% higher) for the default mode than for the power conservation mode. The magnitude of the ramp rate during a ramp to hold portion of the transition (e.g., see 615 in FIG. 6) may be at least a certain degree greater or less in the case of the default mode compared to the power conservation mode, which may be a difference of at least about 5% (e.g., at least about 10%, 20%, 30%, 40%, or 50%). As explained, the power conservation mode may result in a slower transition compared to the default mode. In some cases, the duration of an optical transition may be at least about 5% longer (e.g., 10% longer, 20% longer, 50% longer, 75% longer, or 100% longer) under the power conservation mode compared to the default mode.

Another technique for managing the demand for power on a network of electrochromic windows relates to prioritization of transitions over multiple windows. For instance, if a command is received to drive an optical transition in many windows simultaneously and there is not sufficient available power to do so, a controller (e.g., a network controller or other controller) may direct certain windows to begin transitioning before others do. These other windows may then be directed to begin changing when there is sufficient power available to drive the transitions. In this way, the controller can ensure that the power being demanded by and delivered to the windows remains within the range of power that is able to be supplied by the network. The transitions for the different windows may be overlapping or non-overlapping in time. The windows may be directed to start transitioning individually (on a window-by-window basis) or in groups.

With reference to FIG. 3, in one example the control panel 310 is capable of simultaneously powering optical transitions in three electrochromic windows. Where a command is received to drive a transition in all of the windows, a controller may direct windows 301-303 to change first, and then windows 304-306 to change second. In another example, a controller may direct the windows to change in a more continuous manner, for example directing additional windows to begin changing as soon as there is sufficient power available to do so, even if other transitions are still ongoing.

The controllers may be configured to prioritize the transitions in a particular way, for example favoring certain windows over others, e.g., differentiating by window and/or by zone of windows. In one example, a controller receiving a command to transition all of the windows may execute the command such that windows on a particular side of the building change first. This may be useful where one side of the building is experiencing strong incident light and it is more important that windows on this side of the building tint quickly. The windows can be grouped (e.g., to define multiple zones) and prioritized as desired for a particular application. Prioritization is further described in PCT Patent Application No. PCT/US15/38667, filed Jun. 30, 2015, and titled "CONTROL METHODS AND SYSTEMS FOR NETWORKS OF OPTICALLY SWITCHABLE WINDOWS DURING REDUCED POWER AVAILABILITY," which is herein incorporated by reference in its entirety.

Another technique that can be used to manage the amount of available power is to implement electrochromic windows that may be set to a sleep mode. In some conventional electrochromic window networks, each window controller consumes about 1-2 Watts even when it is not actively controlling a window. Each window may be provided with its own controller, and this wasted power can add up. By enabling a window controller to enter sleep mode, this power can be conserved. In one example a controller in sleep mode may periodically power on to "wake up" and check whether it has received any commands. If such commands have been received, the controller may execute them upon waking up. If no such commands have been received, the controller may go back into sleep mode. When asleep, the controller may draw essentially no power.

In various embodiments, a network of electrochromic windows may include particular sensors that are used to sense the level of voltage and/or current passing to/from/ through various components of the network. For example, sensors may be used to determine the voltage and/or current (a) delivered from a window controller to an electrochromic window, (b) delivered to a window controller, (c) delivered to or from a power source, control panel, energy well, etc.

Such sensors may be useful in identifying problematic situations within the network, for example to identify where and when a component therein is failing or has failed.

The embodiments disclosed herein provide significant flexibility in designing, operating, maintaining, and upgrading networks of electrochromic windows. By managing the supply and/or demand for available power, the network can be configured in a way that avoids "over-engineering" the power distribution network. An over-engineered power distribution network may be one that uses more cabling, higher rated cabling and related protections (e.g., class 1 as opposed to class 2), higher rated power supplies or other power delivery components (e.g., class 1 as opposed to class 2), etc. As discussed above, conventional power distribution networks tend to be over-engineered in order to accommodate the peak power that must be collectively delivered to the electrochromic windows. By managing the supply and/or demand for power as discussed herein, the peak power can be more easily accommodated without over-engineering the power delivery network.

Responses in the Case of a Power Emergency

A number of the techniques described herein, including both those used for managing supply of available power and for managing demand of available power, may be used to address situations that arise due to power emergencies. Example power emergencies include, but are not limited to, blackouts, brownouts, rolling blackouts and brownouts, severe weather affecting power delivery, and emergency response situations to particular threats (fire, criminal activity, etc.), and any other event that results in limited power delivery to a building. In these situations, various components on a power distribution network may adapt in particular ways and/or take particular actions to avoid damaging components on the network.

In some cases where a power emergency occurs, one or more components on the network may be configured to cause the individual electrochromic windows to transition to a safe state before the supply of available power is completely exhausted. For example, when power to a building is cut off or limited, one or more controllers on the network may be configured to draw power from energy wells or other local energy storage units on the power distribution network. The controller(s) may be further configured to cause the power to be delivered to the windows in a manner that transitions the windows to a state in which they will not be damaged if/when the power is exhausted. In many cases, the window will be completely or substantially clear when it is in its safe state. This scenario provides one reason that it is beneficial in certain cases to design a power distribution network to include local energy storage units that collectively have sufficient capacity to power at least one transition to a safe state for all windows on the network.

Another technique that can be utilized when there is a power emergency relates to the power used by individual controllers on the network. As noted herein, controllers consume some amount of power, even when they are not actively controlling a window transition. The controllers may be configured to turn off or go into a sleep mode in response to a power emergency. The controller may be put into sleep mode or powered off after transitioning the window to a safe state in some cases.

An additional technique that can help address a power emergency relates to prioritizing transitions on certain windows over others. As described above, prioritization can be used to stagger transitions of individual windows according to the needs of a particular building/situation. In certain implementations, windows that are relatively more expensive (e.g., larger windows, oddly-shaped windows, custom-built windows, etc.) may be prioritized to transition to a safe state before less expensive windows. This may help limit any damage that is experienced to less expensive windows. The prioritization used may depend on the characteristics of the windows being transitioned. For example, in some implementations, the windows may be prioritized such that small windows transition to a safe state before large windows. This prioritization scheme may be useful in cases where the power used to transition one large window could be used to power transitions on multiple small windows, where the cost to fix the multiple small windows would be greater than the cost to fix the one large window.

Another technique to address power emergencies relates to altering the transition parameters on the windows being transitioned. By altering the transition parameters, the overall power used to transition the windows may be minimized, and the number of windows that can transition to a safe state may be maximized. Each of these power management techniques is described further herein.

In certain implementations, the power distribution network may transfer stored energy (e.g., from one or more energy wells) to other building systems in the case of an emergency. Such other systems may include, e.g., emergency lighting systems, security systems (e.g., locks, alarms, etc.), a public address (PA) system, a sprinkler or other fire suppression system, etc. The energy wells may collectively store sufficient energy to simultaneously transition all of the windows on the network, as well as any energy needed to be transferred to the other building systems to ensure safety/security.

Wiring Considerations

The configuration used to wire the various windows together in a network can affect how efficiently power is transferred over the network. The number of electrochromic devices that can be supported on a power cable is limited by factors including the length and gauge of wiring that is used, the power used by each window, the voltage drop occurring at each window, etc. It is generally beneficial to use less wiring, so long as the wiring provides sufficient power to drive the windows as desired. Wiring used to transfer power may also be used to transfer communication signals.

FIGS. 7 and 8 present schematic views of wiring configurations that may be used in certain embodiments. The networks shown in FIGS. 7 and 8 are power distribution networks that may also serve as communication networks. In FIG. 7, a class 1 control panel is used with class 1 trunk lines rated at 8 Amps each. Power delivery in this embodiment is segmented, with four separate power delivery lines connecting the control panel to different points along the trunk lines. The wires between the trunk line and the window controllers are called "drop lines." Wires that provide power from a power supply to a trunk line may be referred to as power injector lines or power insert lines. In embodiments where the power distribution network includes energy wells, a cable connecting an energy well with the trunk line (or with a drop line) may also be referred to as power injector line or power insert line (though it is understood that the energy wells may also be provided inline on, e.g., a trunk line and/or drop line). In the embodiment of FIG. 7, each of the power injector lines is rated at 15 Amps and 600 V. In some cases the power injector lines may be power limited tray cables (PLTC), as shown in FIG. 7. Each power injector line in this example provides power for up to about 32 window controllers (WCs) and their related windows. For the sake of clarity only two window controllers are shown for each power injector line. Each window controller may be connected to (or integral with) an electrochromic window, though for the sake of clarity only a single electrochromic window is shown in each of FIGS. 7 and 8. A separate communication line may be provided, as shown in FIG. 7, to transfer communication/control information between the control panel and the trunk line, where it can be delivered to the individual window controllers. The trunk line may carry both power and communication information. Alternatively, communication information may be transferred wirelessly, or the trunk line may be directly connected to the control panel.

In FIG. 8, a class 2 control panel is used in combination with class 2 trunk lines and class 2 power injector lines. The trunk lines in this case connect directly to the control panel. The class 2 trunk line and class 2 power injector lines may be rated at less than about 4 Amps. The use of a class 2 control panel/wiring may limit the number of windows that can be driven by individual power lines connected to the class 2 control panel. In this embodiment, up to about 16 window controllers may be powered by each power injector line (for the sake of clarity only one window controller is shown per power injector line). In FIG. 8, transfer of communication information may occur over the trunk line itself or through wireless communication.

The power distribution networks shown in FIGS. 7 and 8 may be modified to include additional energy storage units, for example the energy wells described herein. Such energy wells may increase the number of electrochromic windows/window controllers that may be powered by each power line. As noted above, the energy wells may be attached to or inline with the trunk lines, drop lines, power injector lines, or some combination thereof.

Figure 9:
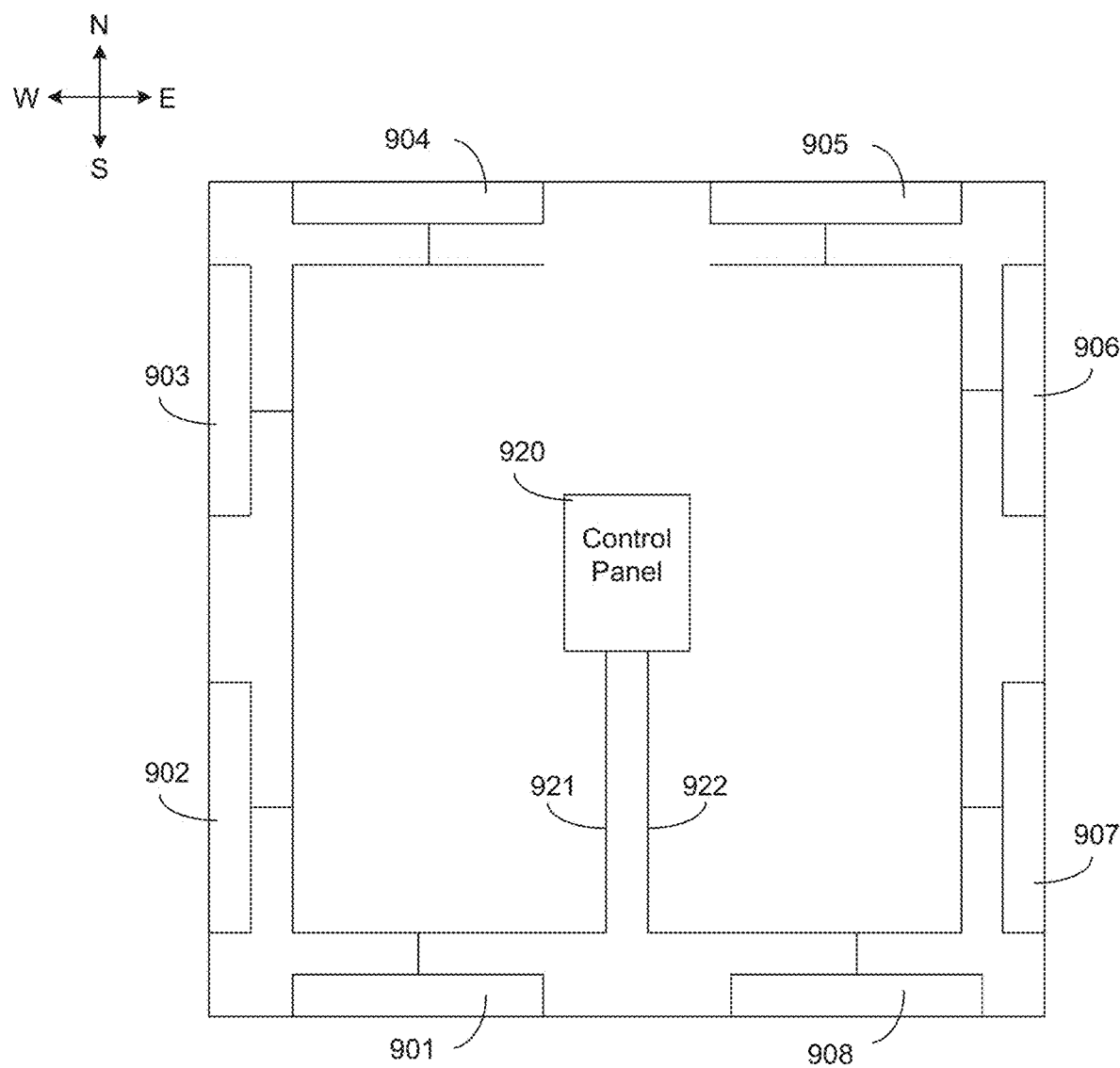
FIGS. 9-11 present views of power distribution networks for electrochromic windows configured according to a number of embodiments.
Figure 10:
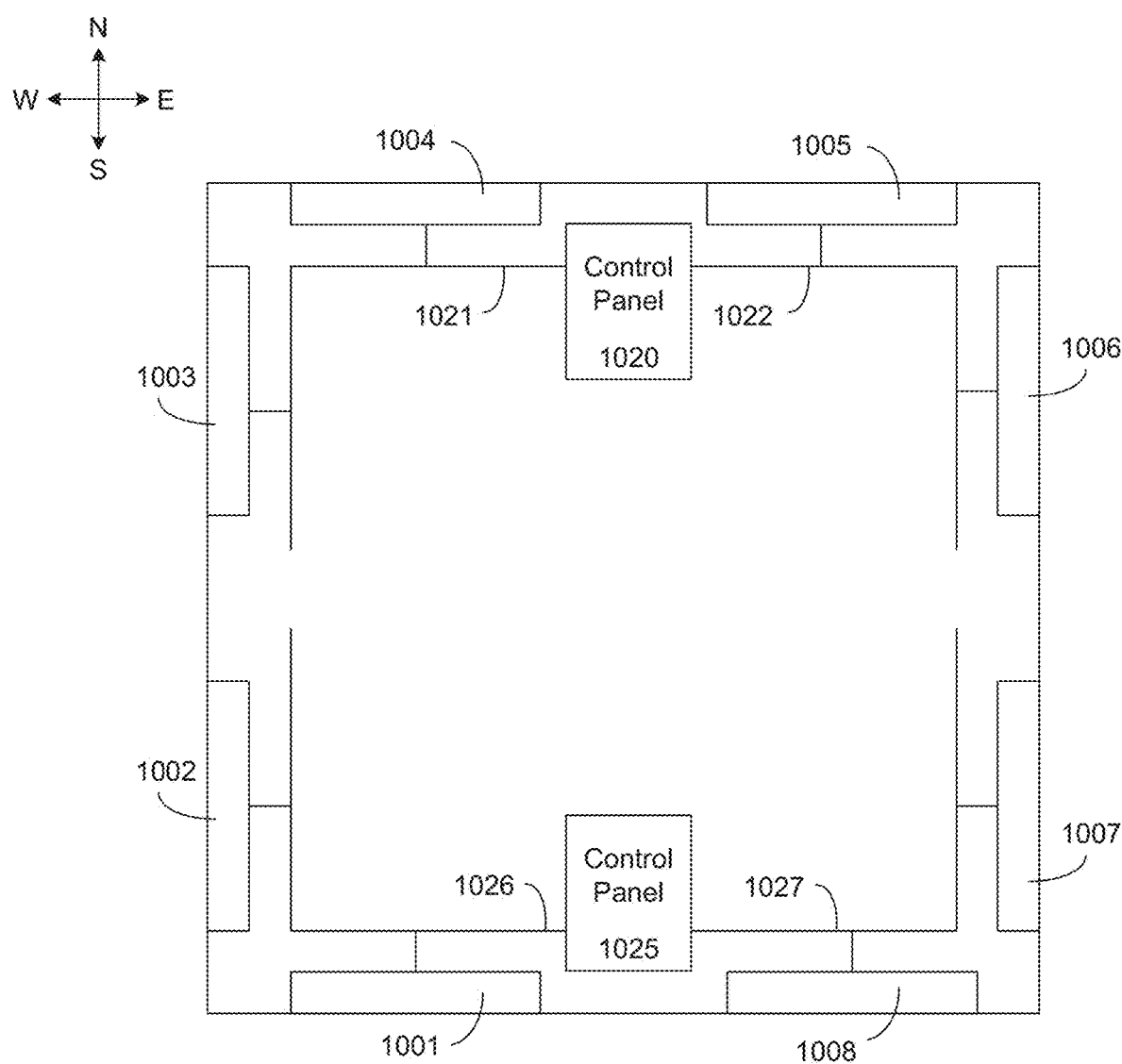
Figure 11:
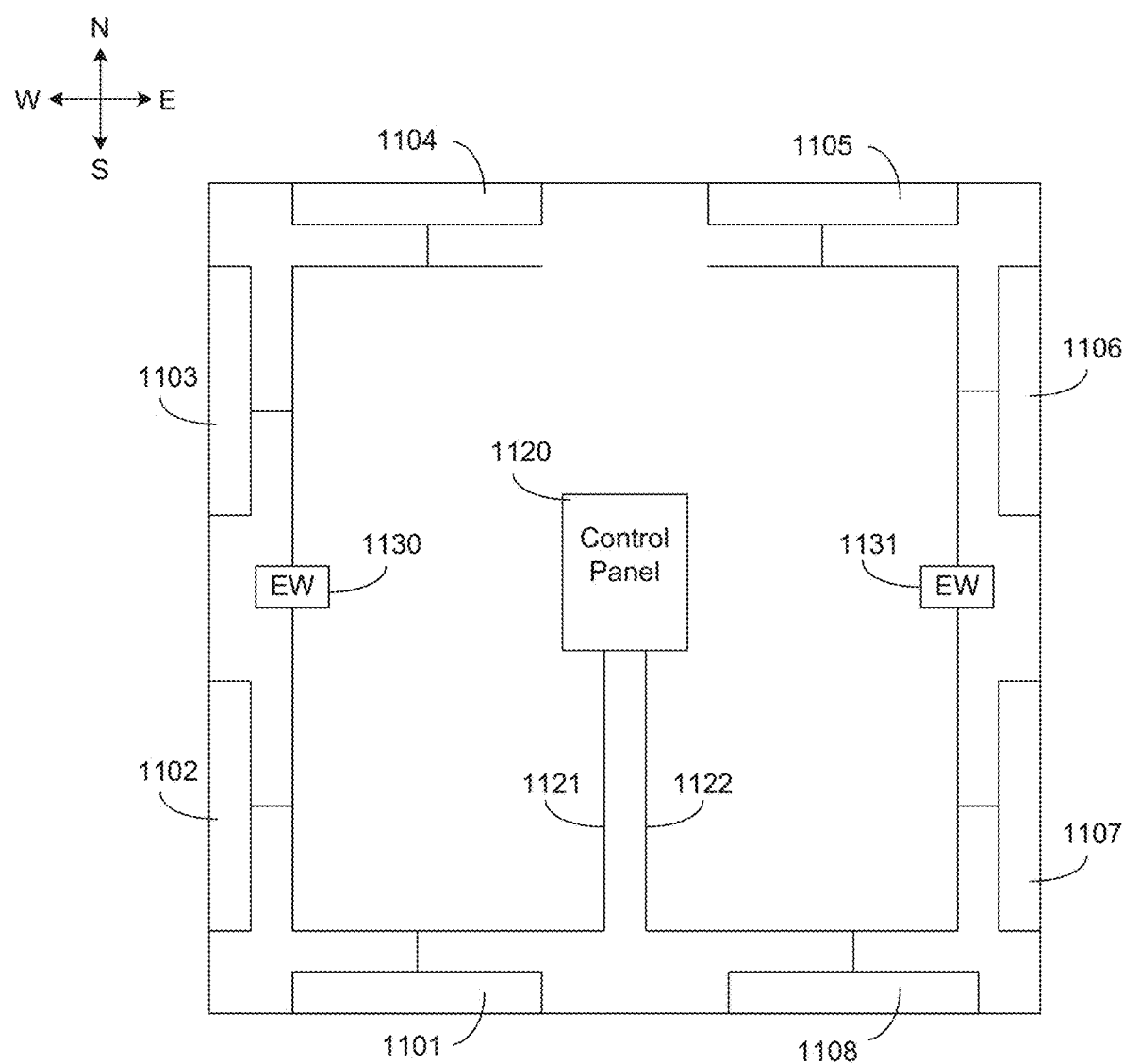

FIGS. 9-11 present simplified top-down views of a network of electrochromic windows installed on one floor of a building. For the sake of simplicity, only two electrochromic windows are shown on each face of the building, though it should be understood that many additional electrochromic windows may be present on the network. In FIG. 9, the control panel 920 is connected to two trunk lines 921 and 922. One trunk line 921 provides power to windows 901-904 and the other trunk line 922 provides power to windows 905-908. Power is provided to each window via a window controller (not shown) that may be connected to or integral with each window. In this implementation, the maximum power that may be delivered to the windows/window controllers is limited by the power output of the control panel 920.

In the embodiment of FIG. 10, two control panels 1020 and 1025 are provided. Each control panel has two trunk lines connected thereto. Control panel 1020 is connected to trunk lines 1021 and 1022, while control panel 1025 is connected to trunk lines 1026 and 1027. Each trunk line in this figure is shown as controlling two windows 1001-1008 (though many more may be provided). The control panels are positioned near the north and south faces of the building. In another embodiment, the control panels may be positioned near the east and west faces of the building. It may be beneficial to use more than one control panel, for example where a large number of electrochromic windows are present, where the building is large and/or the wiring is long, where many windows often transition simultaneously, etc.

In certain implementations, control panels may be strategically located to provide power as needed to multiple windows. For example, if it is known that windows on a particular side of a building are likely to switch simultaneously, it may be beneficial to ensure that sufficient power will be available to switch all of the relevant windows at once. One technique to accomplish this is to ensure that the windows on this side of the building are driven by multiple control panels. In the context of FIG. 10, for example, it may be that all the windows on the east-facing side of the building will all transition to a tinted state around sunrise. In this example the east-facing windows are 1006 and 1007, though in many embodiments a particular side of a building will include a much higher number of electrochromic windows, thereby making power distribution from multiple control panels more attractive. Because windows 1006 and 1007 are driven by separate control panels 1020 and 1025, respectively, there is a lower risk that the power needed to simultaneously drive the windows 1006 and 1007 will exceed the available power. Such power management issues become more important when the number of electrochromic windows is higher, though only a few windows are shown in the figure for the sake of simplicity. In some similar embodiments, each control panel may provide power to windows on multiple floors.

Similar considerations may come into play when considering whether and where to connect power injection lines. For instance, instead of ensuring that windows on a particular side of the building are supplied power from different control panels, the network may be designed such that windows on a particular side of the building are supplied power from different power injection lines. In this way, the power delivered to the windows on that side of a building (which as described above may be controlled to undergo a simultaneous optical transition) may be limited by the power output of the control panel, but is not limited by the amount of power/voltage that can be carried over a single power delivery line. This technique helps avoid wiring limitations that arise due to line loss, for example. The techniques related to the use of multiple control panels and the use of multiple power injection lines to deliver power to windows likely to transition simultaneously can be combined as appropriate for a desired application.

In the embodiment of FIG. 11, a single control panel 1120 is used. The control panel 1120 is connected to two trunk lines 1121 and 1122. Trunk line 1121 provides power to windows 1101-1104, while trunk line 1122 provides power to windows 1105-1108. In this embodiment, two energy wells 1130 and 1131 (EWs) are provided on the power lines 1121 and 1122, respectively. The energy wells 1130 and 1131 may provide a boost of power to transition the various windows as needed. For example, if a command is received to simultaneously transition windows 1101-1104 and the power used by windows 1101-1104 to transition exceeds the power that can be delivered by the control panel 1120 over power line 1121, the energy well 1130 may make up the deficit by discharging to power transitions on window 1103 and/or 1104. The energy well 1130 can recharge itself after the transitions are complete, or even before the transitions are complete if/when the relevant windows are collectively using less power than can be provided by the control panel 1120 over power line 1121. Of course, the techniques described above related to prioritization and/or adaptation of transition parameters may also be used to avoid drawing too much power.

System Flexibility and Upgrades

One advantage of the disclosed techniques is that it enables electrochromic window networks to be more flexible over time. For example, in many conventional networks of electrochromic windows, the system will be sized/designed/implemented a single time. The power requirements of the various components (e.g., control panels) are determined based in part on the number of windows to be included on the network. If installation of additional electrochromic windows onto the network is desired, it can be very challenging. For example, the inclusion of additional windows may render the network incapable of providing sufficient power to drive all (or many) of the windows at once. However, where the power supply and power demand management techniques disclosed herein are used, the network is much more capable of expanding to include additional electrochromic windows. Additional energy wells may be provided as additional windows are installed to store energy that may be needed to drive the additional windows. Further, the logic used to distribute power throughout the network may take into account the increased demand related to the additional windows, and either adjust the transition parameters and/or prioritize the window transitions as needed.

One embodiment may relate to a method of modifying a network of electrochromic windows to include one or more additional electrochromic windows. The network may have a power supply that would be incapable of supporting simultaneous optical transitions on all of the electrochromic windows (including the additional windows) using the transition parameters typically used to drive the transitions before inclusion of the additional windows. By using one or more of the techniques described herein, the modified network may be able to support simultaneous transitions on all of the windows, even without performing a major redesign of the network and power supply.

System Notifications

One advantage of the disclosed embodiments is that a network of electrochromic windows can operate in a "diminished performance" state instead of completely failing. In many conventional networks, the windows will generally perform at optimum conditions until there is an issue and the entire network fails. For instance, a network of windows may operate perfectly until the demand for power exceeds the available supply of power, at which point the circuit may trip and the entire network may fail. This failure can end up damaging the electrochromic devices in some cases. By contrast, with a number of the disclosed techniques, a network may be able to keep the windows running and avoid a power failure in cases where the demand for power approaches or exceeds the power being input into the network. For instance, the use of energy wells may increase the supply of power beyond that which is supplied to the network by the control panel/power supply. Further, adjustment of transition parameters and/or prioritization of transitions can help manage/lower demand for power to ensure that it remains below what is able to be supplied. While the windows may operate at a slower transition rate, or in a staggered pattern, this operational state of diminished performance is far preferable to a non-operational state and the related risk of electrochromic device damage. Such performance differences may not even be noticeable to users in many cases.

In certain embodiments, a system may notify a user/administrator/etc. when the network is experiencing some type of problem. The problem may be identified in some cases by a comparison of power being demanded vs. power being supplied, or by a difference in operation compared to normal operating conditions. Where the network detects that a problem has occurred (e.g., a window has shorted out, a power supply has failed, windows are transitioning slower or in a staggered manner, a wire has become pinched, etc.), a notification may be sent to a user/administrator/etc. to let them know there is a problem. In this way, problematic components or issues within the network can be identified and addressed before there is a system wide failure. For instance, if one window begins to fail and starts using more power than it should, the network may recognize this problem and adjust the transition parameters and/or prioritization of windows to ensure that the windows on the network do not attempt to draw more power than can be supplied by the network. The system can send a notification to a building administrator to let them know that there is a problem with the particular window. The administrator can then take action to have the window fixed, possibly even before it stops working. In this way, serious disruptions to the system can be minimized or avoided. Many of the building occupants may never even realize there was a problem. Compared to conventional systems where similar failures may result in failure of the entire network, the disclosed embodiments represent substantial improvements.

Controllers

Figure 12:
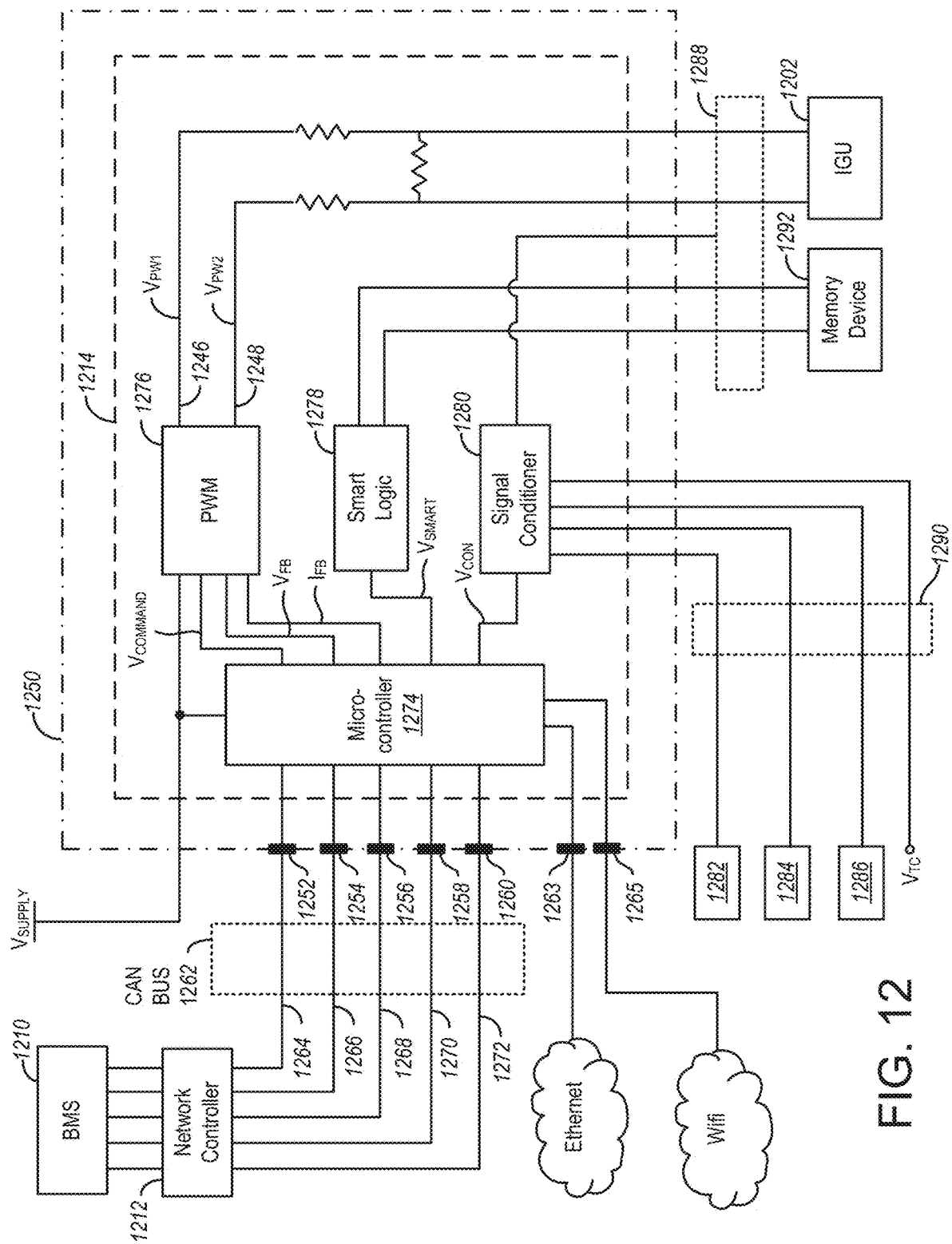
FIG. 12 presents a representation of a window controller and associated components according to certain embodiments.

FIG. 12 depicts a window controller 1214, which may be deployed as, for example, component 1250. In some embodiments, window controller 1214 communicates with a network controller over a communication bus 1262. For example, communication bus 1262 can be designed according to the Controller Area Network (CAN) vehicle bus standard. In such embodiments, first electrical input 1252 can be connected to a first power line 1264 while second electrical input 1254 can be connected to a second power line 1266. In some embodiments, as described above, the power signals sent over power lines 1264 and 1266 are complementary; that is, collectively they represent a differential signal (e.g., a differential voltage signal). In some embodiments, line 1268 is coupled to a system or building ground (e.g., an Earth Ground). In such embodiments, communication over CAN bus 1262 (e.g., between microcontroller 1274 and network controller 1212) may proceed along first and second communication lines 1270 and 1272 transmitted through electrical inputs/outputs 1258 and 1260, respectively, according to the CANopen communication protocol or other suitable open, proprietary, or overlying communication protocol. In some embodiments, the communication signals sent over communication lines 1270 and 1272 are complementary; that is, collectively they represent a differential signal (e.g., a differential voltage signal).

In some embodiments, component 1250 couples CAN communication bus 1262 into window controller 1214, and in particular embodiments, into microcontroller 1274. In some such embodiments, microcontroller 1274 is also configured to implement the CANopen communication protocol. Microcontroller 1274 is also designed or configured (e.g., programmed) to implement one or more drive control algorithms in conjunction with pulse-width modulated amplifier or pulse-width modulator (PWM) 1276, smart logic 1278, and signal conditioner 1280. In some embodiments, microcontroller 1274 is configured to generate a command signal $V_{COMMAND}$, e.g., in the form of a voltage signal, that is then transmitted to PWM 1276. PWM 1276, in turn, generates a pulse-width modulated power signal, including first (e.g., positive) component $V_{PW1}$ and second (e.g., negative) component $V_{PW2}$, based on $V_{COMMAND}$. Power signals $V_{PW1}$ and $V_{PW2}$ are then transmitted over, for example, interface 1288, to IGU 1202, or more particularly, to bus bars in order to cause the desired optical transitions in the electrochromic device. In some embodiments, PWM 1276 is configured to modify the duty cycle of the pulse-width modulated signals such that the durations of the pulses in signals $V_{PW1}$ and $V_{PW2}$ are not equal: for example, PWM 1276 pulses $V_{PW1}$ with a first 60% duty cycle and pulses $V_{PW2}$ for a second 40% duty cycle. The duration of the first duty cycle and the duration of the second duty cycle collectively represent the duration, $t_{PWM}$ of each power cycle. In some embodiments, PWM 1276 can additionally or alternatively modify the magnitudes of the signal pulses $V_{PW1}$ and $V_{PW2}$.

In some embodiments, microcontroller 1274 is configured to generate $V_{COMMAND}$ based on one or more factors or signals such as, for example, any of the signals received over CAN bus 1262 as well as voltage or current feedback signals, $V_{FB}$ and $I_{FB}$ respectively, generated by PWM 276. In some embodiments, microcontroller 1274 determines current or voltage levels in the electrochromic device based on feedback signals $I_{FB}$ or $V_{FB}$, respectively, and adjusts $V_{COMMAND}$ according to one or more rules or algorithms to effect a change in the relative pulse durations (e.g., the relative durations of the first and second duty cycles) or amplitudes of power signals $V_{PW1}$ and $V_{PW2}$ to produce voltage profiles as described above. Additionally or alternatively, microcontroller 1274 can also adjust $V_{COMMAND}$ in response to signals received from smart logic 1278 or signal conditioner 1280. For example, a conditioning signal $V_{CON}$ can be generated by signal conditioner 1280 in response to feedback from one or more networked or non-networked devices or sensors, such as, for example, an exterior photosensor or photodetector 1282, an interior photosensor or photodetector 1284, a thermal or temperature sensor 1286, or a tint command signal $V_{TC}$. For example, additional embodiments of signal conditioner 1280 and $V_{CON}$ are also described in U.S. Pat. No. 8,705,162, which is incorporated by reference herein.

In certain embodiments, $V_{TC}$ can be an analog voltage signal between 0 V and 10 V that can be used or adjusted by users (such as residents or workers) to dynamically adjust the tint of an IGU 1202 (for example, a user can use a control in a room or zone of a building similarly to a thermostat to finely adjust or modify a tint of the IGUs 1202 in the room or zone) thereby introducing a dynamic user input into the logic within microcontroller 274 that determines $V_{COMMAND}$. For example, when set in the 0 to 2.5 V range, $V_{TC}$ can be used to cause a transition to a 5% T state, while when set in the 2.51 to 5 V range, $V_{TC}$ can be used to cause a transition to a 20% T state, and similarly for other ranges such as 5.1 to 7.5 V and 7.51 to 10 V, among other range and voltage examples. In some embodiments, signal conditioner 1280 receives the aforementioned signals or other signals over a communication bus or interface 1290. In some embodiments, PWM 1276 also generates $V_{COMMAND}$ based on a signal $V_{SMART}$ received from smart logic 1278. In some embodiments, smart logic 1278 transmits $V_{SMART}$ over a communication bus such as, for example, an Inter-Integrated Circuit (I²C) multi-master serial single-ended computer bus. In some other embodiments, smart logic 1278 communicates with memory device 1292 over a 1-WIRE device communications bus system protocol (by Dallas Semiconductor Corp., of Dallas, Tex.).

In some embodiments, microcontroller 1274 includes a processor, chip, card, or board, or a combination of these, which includes logic for performing one or more control functions. Power and communication functions of microcontroller 1274 may be combined in a single chip, for example, a programmable logic device (PLD) chip or field programmable gate array (FPGA), or similar logic. Such integrated circuits can combine logic, control and power functions in a single programmable chip. In one embodiment, where one pane has two electrochromic devices (e.g., on opposite surfaces) or where IGU 1202 includes two or more panes that each include an electrochromic device, the logic can be configured to control each of the two electrochromic devices independently from the other. However, in one embodiment, the function of each of the two electrochromic devices is controlled in a synergistic fashion, for example, such that each device is controlled in order to complement the other. For example, the desired level of light transmission, thermal insulative effect, or other property can be controlled via a combination of states for each of the individual electrochromic devices. For example, one electrochromic device may be placed in a colored state while the other is used for resistive heating, for example, via a transparent electrode of the device. In another example, the optical states of the two electrochromic devices are controlled so that the combined transmissivity is a desired outcome.

In general, the logic used to control electrochromic device transitions can be designed or configured in hardware and/or software. In other words, the instructions for controlling the drive circuitry may be hard coded or provided as software. In may be said that the instructions are provided by "programming." Such programming is understood to include logic of any form including hard coded logic in digital signal processors and other devices which have specific algorithms implemented as hardware. Programming is also understood to include software or firmware instructions that may be executed on a general purpose processor. In some embodiments, instructions for controlling application of voltage to the bus bars are stored on a memory device associated with the controller or are provided over a network. Examples of suitable memory devices include semiconductor memory, magnetic memory, optical memory, and the like. The computer program code for controlling the applied voltage can be written in any conventional computer readable programming language such as assembly language, C, C++, Pascal, Fortran, and the like. Compiled object code or script is executed by the processor to perform the tasks identified in the program.

As described above, in some embodiments, microcontroller 1274, or window controller 1214 generally, also can have wireless capabilities, such as wireless control and powering capabilities. For example, wireless control signals, such as radio-frequency (RF) signals or infra-red (IR) signals can be used, as well as wireless communication protocols such as WiFi (mentioned above), Bluetooth, Zigbee, EnOcean, among others, to send instructions to the microcontroller 1274 and for microcontroller 1274 to send data out to, for example, other window controllers, a network controller 1212, or directly to a BMS 1210. In various embodiments, wireless communication can be used for at least one of programming or operating the electrochromic device, collecting data or receiving input from the electrochromic device or the IGU 1202 generally, collecting data or receiving input from sensors, as well as using the window controller 1214 as a relay point for other wireless communications. Data collected from IGU 1202 also can include count data, such as a number of times an electrochromic device has been activated (cycled), an efficiency of the electrochromic device over time, among other useful data or performance metrics.

The window controller 1214 also can have wireless power capability. For example, window controller can have one or more wireless power receivers that receive transmissions from one or more wireless power transmitters as well as one or more wireless power transmitters that transmit power transmissions enabling window controller 1214 to receive power wirelessly and to distribute power wirelessly to electrochromic device. Wireless power transmission includes, for example, induction, resonance induction, RF power transfer, microwave power transfer, and laser power transfer. For example, U.S. Pat. No. 9,081,246, incorporated by reference herein, describes in detail various embodiments of wireless power capabilities.

In order to achieve a desired optical transition, the pulse-width modulated power signal is generated such that the positive component $V_{PW1}$ is supplied to, for example, a first bus bar during the first portion of the power cycle, while the negative component $V_{PW2}$ is supplied to, for example, a second bus bar during the second portion of the power cycle.

In some cases, depending on the frequency (or inversely the duration) of the pulse-width modulated signals, this can result in the first bus bar floating at substantially the fraction of the magnitude of $V_{PW1}$ that is given by the ratio of the duration of the first duty cycle to the total duration $t_{PWM}$ of the power cycle. Similarly, this can result in the second bus bar floating at substantially the fraction of the magnitude of $V_{PW2}$ that is given by the ratio of the duration of the second duty cycle to the total duration $t_{PWM}$ of the power cycle. In this way, in some embodiments, the difference between the magnitudes of the pulse-width modulated signal components $V_{PW1}$ and $V_{PW2}$ is twice the effective DC voltage across terminals 1246 and 1248, and consequently, across the electrochromic device. Said another way, in some embodiments, the difference between the fraction (determined by the relative duration of the first duty cycle) of $V_{PW1}$ applied to the first bus bar and the fraction (determined by the relative duration of the second duty cycle) of $V_{PW2}$ applied to the second bus bar is the effective DC voltage $V_{EFF}$ applied to electrochromic device. The current $I_{EFF}$ through the load—electromagnetic device—is roughly equal to the effective voltage $V_{EFF}$ divided by the effective resistance or impedance of the load.

Controllers for controlling optical transitions on optically switchable devices (and networks of such devices) are further described in U.S. Provisional Patent Application No. 62/248,181, filed Oct. 29, 2015, and titled "CONTROLLERS FOR OPTICALLY-SWITCHABLE DEVICES," which is herein incorporated by reference in its entirety.

Those of ordinary skill in the art will also understand that this description is applicable to various types of drive mechanism including fixed voltage (fixed DC), fixed polarity (time varying DC) or a reversing polarity (AC, MF, RF power etc. with a DC bias).

The controller may be configured to monitor voltage and/or current from the optically switchable device. In some embodiments, the controller is configured to calculate current by measuring voltage across a known resistor in the driving circuit. Other modes of measuring or calculating current may be employed. These modes may be digital or analog.

What is claimed is:

1. A system for controlling a plurality of tintable windows in a building, the system comprising:
    (a) the plurality of tintable windows, disposed between the interior and exterior of the building;
    (b) a plurality of window controllers for controlling the plurality of tintable windows, the plurality of window controllers disposed on a network, the network configured to identify one or both of a security threat and a power emergency situation and issue instructions to the plurality of window controllers, wherein:
    the plurality of window controllers are configured to execute the issued instructions to adjust a tint state of at least one of the plurality of tintable windows responsive to the identified security threat and/or the identified power emergency situation.

2. The system of claim 1, further comprising one or more energy wells electrically connected with the power supply and with the plurality of window controllers, wherein the one or more energy wells are provided electrically downstream from the power supply and electrically upstream from at least one of the plurality of window controllers, wherein the network is configured to transfer power from the energy wells to the plurality of window controllers when the plurality of window controllers collectively demand a greater amount of power than can be provided by the power supply, and to transfer power from the power supply to the energy wells to recharge the energy wells when the plurality of window controllers collectively demand a lower amount of power than can be provided by the power supply.

3. The system of claim 1, wherein the plurality of window controllers are configured to simultaneously adjust the plurality of windows to a decreased tint state responsive to the identified security threat.

4. The system of claim 3, wherein the identified security threat is a fire or criminal activity.

5. The system of claim 3, wherein the identified security threat is a blackout, a brownout, or severe weather conditions.

6. The system of claim 1, wherein the plurality of window controllers are configured to simultaneously adjust the plurality of windows to an increased tint state responsive to the identified security threat.

7. The system of claim 6, wherein the identified security threat is a fire or criminal activity.

8. The system of claim 6, wherein the identified security threat is a blackout, a brownout, or severe weather conditions.

9. A method for controlling a plurality of tintable windows in a building, the method comprising:
    (a) with a network, identifying one or both of a security threat and a power emergency situation and issuing instructions to at least one of a plurality of window controllers disposed on the network, wherein the plurality of window controllers are configured for controlling the tint states of the plurality of tintable windows; and
    (b) with the plurality of controllers, adjusting a tint state of at least one of the plurality of tintable windows responsive to the issued instructions issued and to the identified security threat and/or the identified power emergency situation.

10. The method of claim 9, wherein the plurality of window controllers are electrically connected with one or more energy wells, wherein the one or more energy wells are provided electrically downstream from the power supply and electrically upstream from at least one of the plurality of window controllers, wherein the method further comprising operations of:
    transferring power from the one or more energy wells to the plurality of window controllers when the plurality of window controllers collectively demand a greater amount of power than can be provided by the power supply; and
    transferring power from the power supply to the one or more energy wells to recharge the one or more energy wells when the plurality of window controllers collectively demand a lower amount of power than can be provided by the power supply.

11. The method of claim 9, wherein adjusting the tint state of at least one of the plurality of tintable windows comprises simultaneously adjusting at least two tintable windows to decreased tint state responsive to the identified security threat.

12. The method of claim 11, wherein identifying a security threat comprises identifying fire or criminal activity.

13. The method of claim 11, wherein identifying a security threat comprises identifying a blackout, a brownout, or severe weather conditions.

14. The method of claim 9, wherein adjusting the tint state of at least one of the plurality of tintable windows comprises simultaneously adjusting at least two tintable windows to an increased tint state responsive to the identified security threat.

15. The method of claim 14, wherein identifying a security threat comprises identifying fire or criminal activity.

16. The method of claim 14, wherein identifying a security threat comprises identifying a blackout, a brownout, or severe weather conditions.

* * * * *